United States Patent
Bolender et al.

(10) Patent No.: US 7,479,788 B2
(45) Date of Patent: Jan. 20, 2009

(54) CAPACITIVE SENSING DEVICE TUNING

(75) Inventors: Robert J. Bolender, Santa Clara, CA (US); Tom Harvey, Santa Clara, CA (US); Sean D. Pham, Santa Clara, CA (US); Joseph K. Reynolds, Santa Clara, CA (US); Umha Mahesh Srinivasan, Santa Clara, CA (US); Adam Tucholski, Santa Clara, CA (US); Mykola Golovchenko, Santa Clara, CA (US)

(73) Assignee: Synaptics Incorporated, Santa Clara, CA (US)

( * ) Notice: Subject to any disclaimer, the term of this patent is extended or adjusted under 35 U.S.C. 154(b) by 251 days.

(21) Appl. No.: 11/639,626

(22) Filed: Dec. 14, 2006

(65) Prior Publication Data
US 2008/0147362 A1     Jun. 19, 2008

(51) Int. Cl.
*G01R 27/26* (2006.01)
(52) U.S. Cl. .................... 324/658; 324/76.11
(58) Field of Classification Search ............. 324/658, 324/76.11
See application file for complete search history.

(56) References Cited

U.S. PATENT DOCUMENTS

| 4,862,516 A | * | 8/1989 | Macnak et al. ............ 455/193.1 |
| 6,647,273 B2 | * | 11/2003 | Parssinen et al. ............ 455/522 |
| 2005/0200422 A1 | * | 9/2005 | Shamsaifar et al. ........ 333/17.1 |

* cited by examiner

Primary Examiner—Vincent Q Nguyen

(57) ABSTRACT

In one embodiment, the present invention receives sensitivity data corresponding to a plurality of first sensor channels of a respective plurality of capacitive sensing devices and utilizes the sensitivity data to determine a range of expected variation pertaining to the plurality of first sensor channels. The range of expected variation has an upper and a lower limit. The present embodiment also relates the range of expected variation to a sensitivity value corresponding to one of the plurality of first sensor channels. The present embodiment determines at least one performance characteristic of the one of the plurality of first sensor channels near at least one of the upper limit and the lower limit. In this embodiment, the at least one performance characteristic enables the tuning of the plurality of first sensor channels of the respective plurality of capacitive sensing devices.

50 Claims, 19 Drawing Sheets

CAPACITIVE SENSING DEVICE TUNING

BACKGROUND

Conventional computing and electronic devices enable a user to input a choice or a selection in different ways. For example, a user can employ an alphanumeric keyboard, a cursor control device or a microphone to indicate a choice or selection. Moreover, capacitive sensing devices can be also used to provide an input selection to a computing device or other types of electronic devices.

A capacitive sensing device can include a number of capacitive sensor channels. More specifically, capacitive sensing devices are typically composed of some combination of capacitive components such as, for example, capacitive buttons, capacitive sliders or wheels, and capacitive pads. Each of these components is, in turn, composed of one or more individual capacitive sensor channels which must have their individual sensitivities tuned for the application and/or embodiment for which they are currently being designed. Hence, when developing a capacitive sensing device, one of the key tasks is to determine the proper sensitivity settings for each capacitive sensor channel.

Conventional methods of determining the proper sensitivity settings for capacitive sensor channels have been aimed at adjusting the sensitivity settings based upon a nominal (i.e., average or typical) capacitive sensing device. In actual use, however, tuning sensitivity settings for capacitive sensor channels based upon a nominal capacitive sensing device is not the optimal overall solution for mass production. That is, in mass production, the sensor channel (or sensor channels) on one capacitive sensing device will not have the same sensitivity value as the sensor channel (or sensor channels) on a different capacitive sensing device built in the same mass production process. Variations in plastic cover thickness, adhesive thickness and uniformity, capacitive sensor geometry, electronic variation, and numerous other sources will result in the capacitive sensing devices having variations in their respective sensor channel sensitivity values. More specifically, in a typical mass production process, the individual sensor channels will have variations in their respective sensitivity values about an average sensitivity value. As a result, unless each individual sensor channel of each capacitive sensing device produced in the same mass production process is individually adjusted to reproduce the same sensitivity value, a distribution of sensitivity values will occur across the sensor channels of the capacitive sensing devices produced in the mass production process.

The conventional methods for determining proper sensor channel sensitivity settings for mass produced capacitive sensing devices typically attempt to choose the most average or typical capacitive sensing device (sometimes called a "golden board"). This particular golden board is then used as a standard for tuning the sensitivity settings of other capacitive sensing devices manufactured in the same mass production process. Such an approach has drawbacks associated therewith. As an example, in a reasonable sample size of candidate capacitive sensing devices, it is highly unlikely that on a single capacitive sensing device each sensor channel will exhibit the average or nominal sensitivity value. For example, on a single capacitive sensing device having multiple sensor channels, a first sensor channel may exhibit a sensitivity value at or near the nominal sensitivity value for that particular sensor channel. However, on the same single capacitive sensing device, a second sensor channel may exhibit a sensitivity value quite different from the nominal sensitivity value for that particular sensor channel. Hence, when considering only the first sensor channel, the single capacitive sensing device may be appropriate to use as the golden board for the first sensor channel. At the same time, however, when considering only the second sensor channel, the single capacitive sensing device is not appropriate to use as the golden board for the second sensor channel. Even when a best choice is made by choosing a golden board by using a weighting algorithm which favors overall conformance to the average, one or more individual sensor channels of the chosen golden board may still vary significantly from the average sensitivity value for those one or more individual sensor channels.

As yet another drawback, even when using a mass production process, it may be necessary or desirable to choose production sensitivities using a relatively small number of prototype capacitive sensing devices. In such a circumstance, due to the relatively small number of capacitive sensing devices manufactured (i.e., the small sample size), it may not be possible to find an individual board with all channels sufficiently near the average. Therefore, the selection of an appropriate golden board becomes less obvious, and the relative importance of the golden board as a standard for tuning of other capacitive sensing devices is compromised.

Accordingly, a method and apparatus for enabling the tuning of a capacitive sensing device, but wherein the method and apparatus avoid the drawbacks mentioned above, would be advantageous.

SUMMARY

Embodiments in accordance with the present invention pertain to methods and systems for enabling the tuning of a capacitive sensing device. In one method embodiment, the present invention receives sensitivity data corresponding to a plurality of first sensor channels of a respective plurality of capacitive sensing devices. The present embodiment then utilizes the sensitivity data to determine a range of expected variation pertaining to the plurality of first sensor channels. The range of expected variation pertaining to the plurality of first sensor channels has an upper limit and a lower limit. The present embodiment also relates the range of expected variation pertaining to the plurality of first sensor channels to a sensitivity value corresponding to one of the plurality of first sensor channels. In such an embodiment, the present invention determines at least one performance characteristic of the one of the plurality of first sensor channels near at least one of the upper limit and the lower limit of the range of expected variation (or one of the desired performance level extremes) pertaining to the plurality of first sensor channels. In the present embodiment, the at least one performance characteristic enables the tuning of the plurality of first sensor channels of the respective plurality of capacitive sensing devices.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
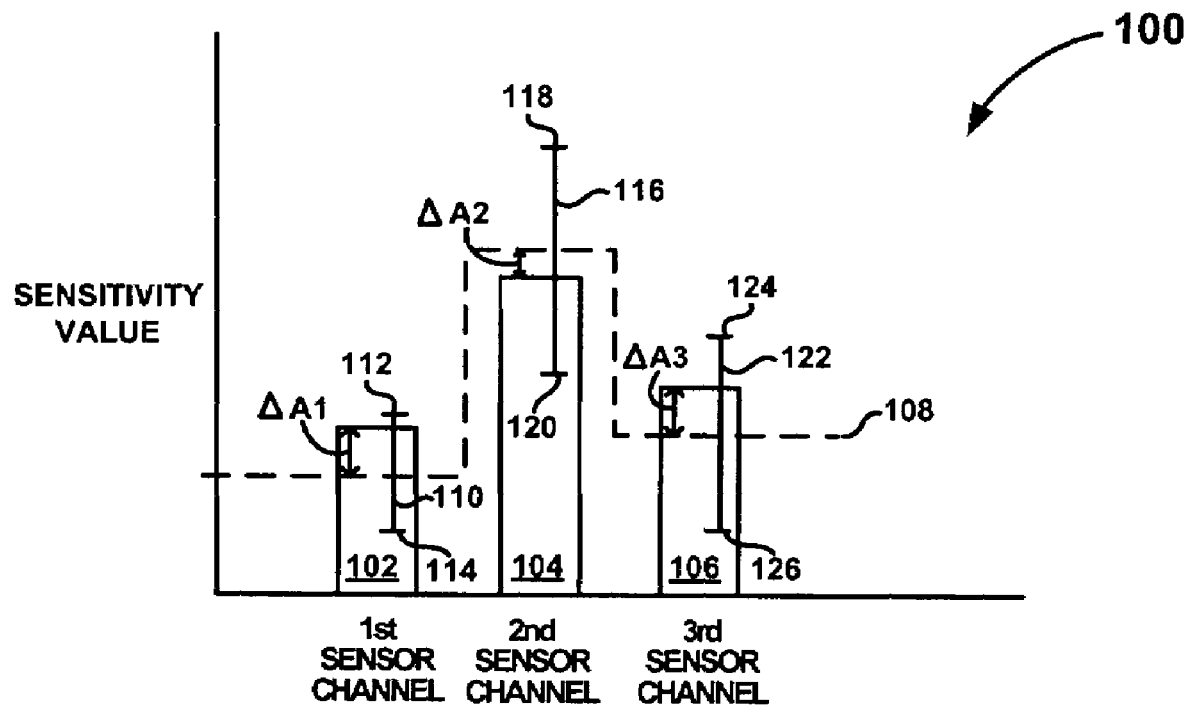
FIG. 1 is a graph depicting sensitivity values for a plurality of sensor channels of a capacitive sensing device A in accordance with embodiments of the present invention.
Figure 2:
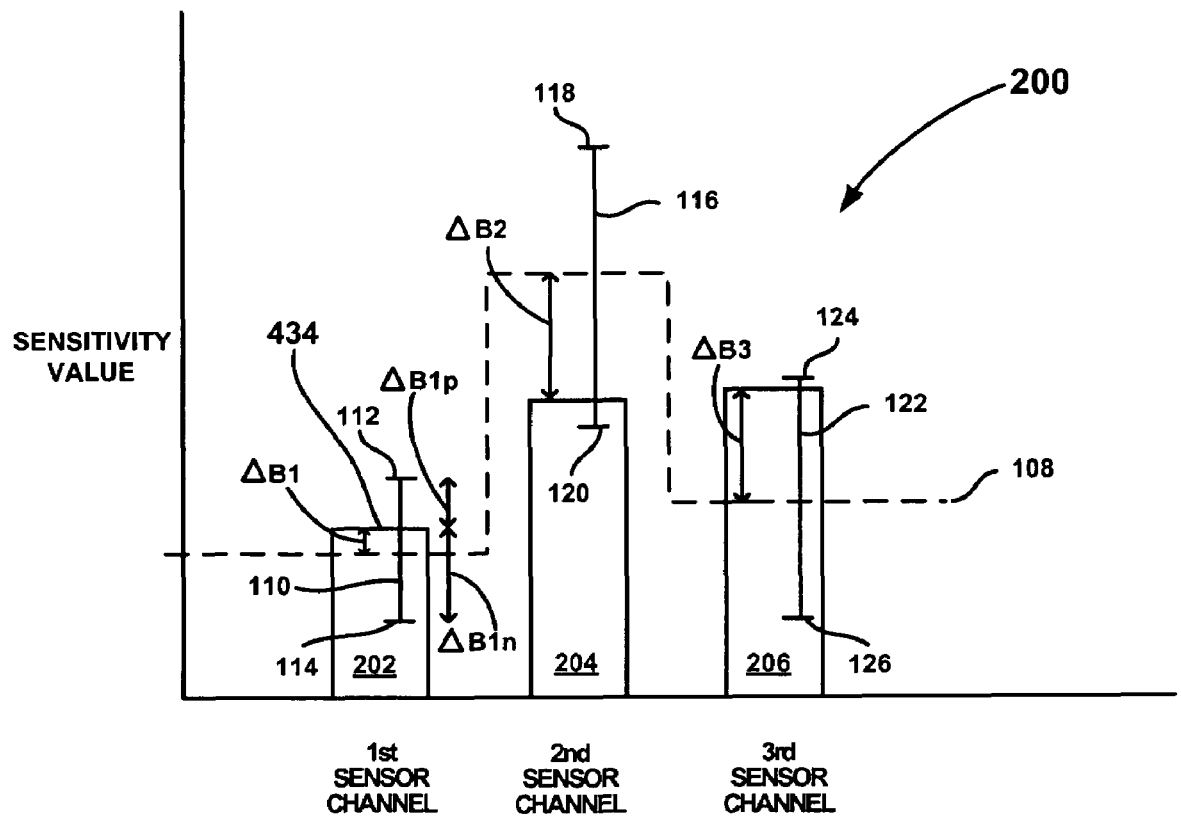
FIG. 2 is a graph depicting sensitivity values for a plurality of sensor channels of a capacitive sensing device B in accordance with embodiments of the present invention.
Figure 3:
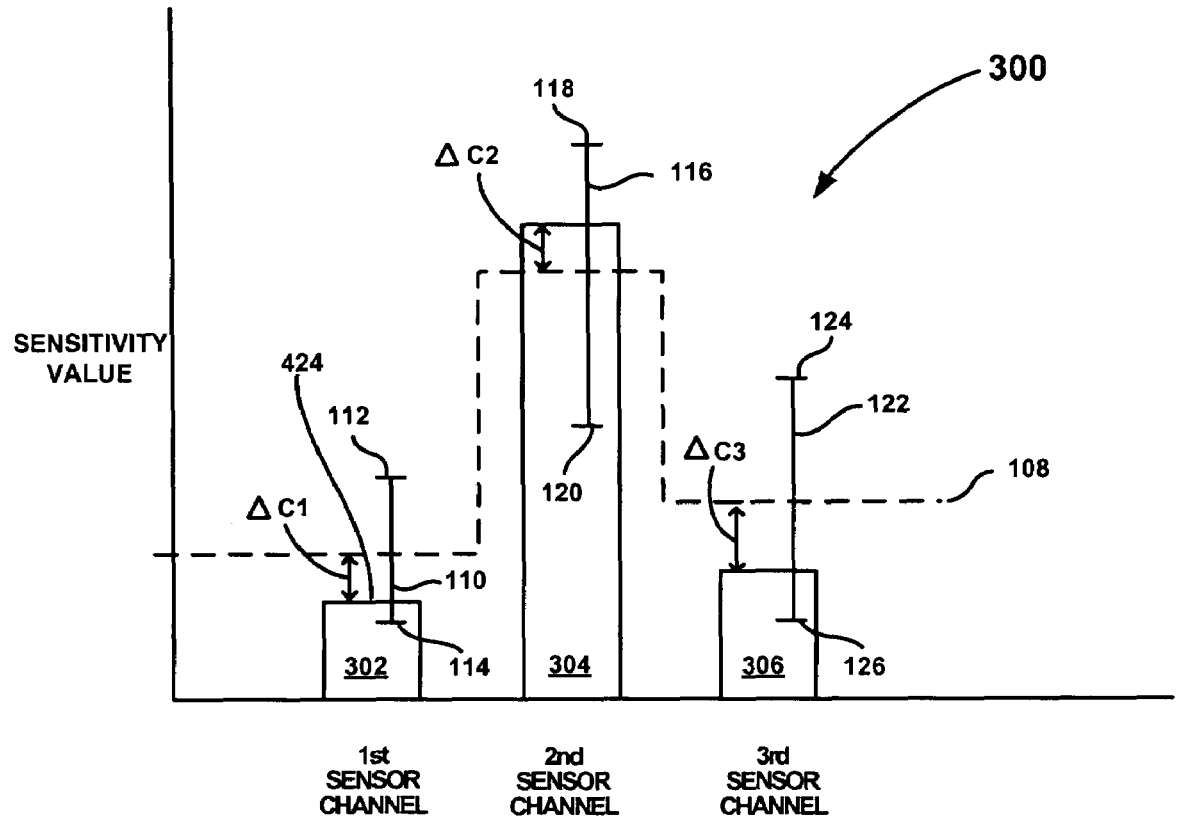
FIG. 3 is a graph depicting sensitivity values for a plurality of sensor channels of a capacitive sensing device C in accordance with embodiments of the present invention.
Figure 9:
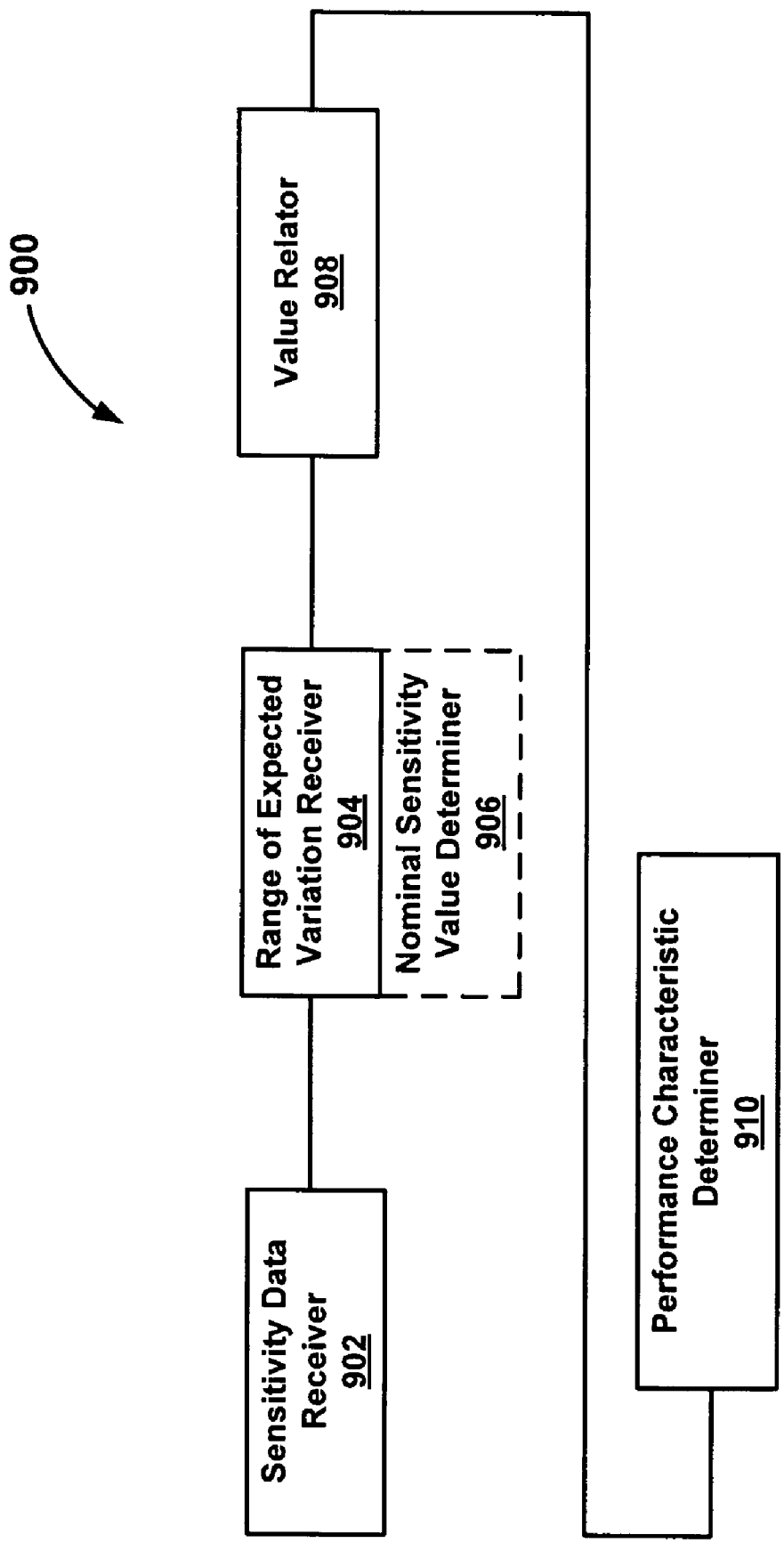
FIG. 9 is a system diagram which can be implemented in software, firmware, hardware, or any combination thereof for performing a method for enabling the tuning of a capacitive sensing device.

The following discussion of FIG. 1, FIG. 2, and FIG. 3 is intended to provide an exemplary description of sensitivity data corresponding to a plurality of sensor channels of a respective plurality of capacitive sensing devices. Moreover, it is to be assumed that capacitive sensing devices were manufactured in the same production process. As will be described in detail below, once such sensitivity data is received, embodiments in accordance with the present invention ultimately enable the tuning of the plurality of capacitive sensing devices. Embodiments in accordance with the present invention will also be described in conjunction with system 900 of FIG. 9. FIG. 9 depicts a system 900 which can be implemented in software, firmware, hardware, or any combination thereof for performing the below described method for enabling the tuning of a capacitive sensing device. Additionally, system 900 of FIG. 9 is well suited to being implemented in a distributed or collective manner across one or more physical or virtual computing devices.

Referring now to FIG. 1, a graph 100 is shown which depicts sensitivity values for a plurality of sensor channels of a capacitive sensing device A, in accordance with embodiments of the invention. More specifically, in this embodiment, capacitive sensing device A is comprised of three sensor channels defined as a first sensor channel 102, a second sensor channel 104, and a third sensor channel 106.

Similarly, as shown in FIG. 2, a graph 200 is shown which depicts sensitivity values for a plurality of sensor channels of a capacitive sensing device B, in accordance with embodiments of the invention. In this embodiment, capacitive sensing device B is comprised of three sensor channels defined as a first sensor channel 202, a second sensor channel 204, and a third sensor channel 206.

Also, as shown in FIG. 3, a graph 300 is shown which depicts sensitivity values for a plurality of sensor channels of a capacitive sensing device C, in accordance with embodiments of the invention. In this embodiment, capacitive sensing device C is comprised of three sensor channels defined as a first sensor channel 302, a second sensor channel 304, and a third sensor channel 306.

Although three sensor channels are depicted in graphs 100, 200, and 300 of FIG. 1, FIG. 2, and FIG. 3, respectively, it should be understood that such a quantity of sensor channels is used herein for purposes of illustration. It should further be understood that embodiments in accordance with the present invention are well suited to use with various other quantities of sensor channels per capacitive sensing device, and with other numbers of sensing devices.

For purposes of the following discussion, it is to be assumed that capacitive sensing device A, capacitive sensing device B, and capacitive sensing device C were manufactured in the same production process, similar to that to be used for mass production. In the following discussion, for purposes of brevity and clarity, only three capacitive sensing devices are discussed as being manufactured in the same mass production process. It should be understood that embodiments in accordance with the present invention are well suited to use with mass production processes which generate a different (e.g. fewer or significantly greater) quantities of capacitive sensing devices.

Referring again to FIG. 1, each of the three sensor channels 102, 104, and 106 has a respective operating sensitivity value which is graphically indicated in graph 100. Moreover, graph 100 also includes a dotted line 108 which indicates an average or nominal sensitivity value for each particular sensor channel. In one embodiment, the nominal sensitivity values defined by dotted line 108 are derived by determining the mean sensitivity value for each sensor channel produced in the mass production process. As an example, in the present embodiment, the nominal sensitivity value for the first sensor channel is determined by summing the operating sensitivity values of sensor channels 102, 202, and 302, and then dividing the sum of the sensitivity values by the number of sensing devices (i.e. three, in this embodiment). Although such a computational method is utilized in accordance with the present embodiment, embodiments in accordance with the present invention are well suited to use with various other methods for determining the nominal sensitivity value for a sensor channel. Such alternative methods include, but are not limited to, methods utilizing weighting schemes where one or more sensor channels are treated differently from other sensor channels, various mean, median, mode, etc., or other statistical methods of determining limiting or nominal values for a distribution, and the like. Further, it will be noted that in the present embodiment, the nominal sensitivity value is different for each sensor channel. Although this is the case in the present embodiment, the present invention is also well suited to use in instances where the nominal sensitivity value is not different for all sensor channels. Also, as will be discussed in detail below, the operating sensitivity value for each of the sensor channels is evaluated and ultimately adjusted separately. The present invention may also be utilized in accordance with embodiments in which the capacitive sensing devices are tuned, not by having the one or more performance characteristics for each sensor channel tuned individually, but in which the capacitive sensing device is tuned by adjusting one of more performance characteristics of two or more sensor channels of the capacitive sensing device together.

Referring still to FIG. 1, graph 100 depicts the deviation of the operating sensitivity value of each sensor channel from the nominal sensitivity value for each sensor channel. In graph 100, the deviation of sensor channel 102 from the nominal sensitivity value is shown as $\Delta A_1$, the deviation of sensor channel 104 from the nominal sensitivity value is shown as $\Delta A_2$, and the deviation of sensor channel 106 from the nominal sensitivity value is shown as $\Delta A_3$. Similarly, in graph 200 of FIG. 2, the deviation of sensor channel 202 from the nominal sensitivity value is shown as $\Delta B_1$, the deviation of sensor channel 204 from the nominal sensitivity value is shown as $\Delta B_2$, and the deviation of sensor channel 206 from the nominal sensitivity value is shown as $\Delta B_3$. Likewise, in graph 300 of FIG. 3, the deviation of sensor channel 302 from the nominal sensitivity value is shown as $\Delta C_1$, the deviation of sensor channel 304 from the nominal sensitivity value is shown as $\Delta C_2$, and the deviation of sensor channel 306 from the nominal sensitivity value is shown as $\Delta C_3$.

Referring still to FIGS. 1-3, FIGS. 1-3 each include a range of expected variation 110, 116, and 122 corresponding to the first sensor channels (102, 202, and 302), the second sensor channels (104, 204, and 304), and the third sensor channels (106, 206, and 306), respectively. Additionally, range of expected variation 110 has an upper limit 112 and a lower limit 114. Similarly, range of expected variation 116 has an upper limit 118 and a lower limit 120. Also, range of expected variation 122 has an upper limit 124 and a lower limit 126. In the present embodiment, each of the sensor channels (102, 104, 106, 202, 204, 206, 302, 304, and 306) has a sensitivity value in which the deviation is within the range of expected variation (as shown by 110, 116, and 122). Although this happens in the present embodiment, the present invention is also well suited to embodiments in which one or more of the sensor channels has deviation which is outside of the range of expected variation. In FIG. 2 the range of expected variation 110 is related to the first sensor channel 202 and point 434 by $\Delta B1p$ at a positive limit 112 and by $\Delta B1n$ at a negative limit 114.

Figure 4A:
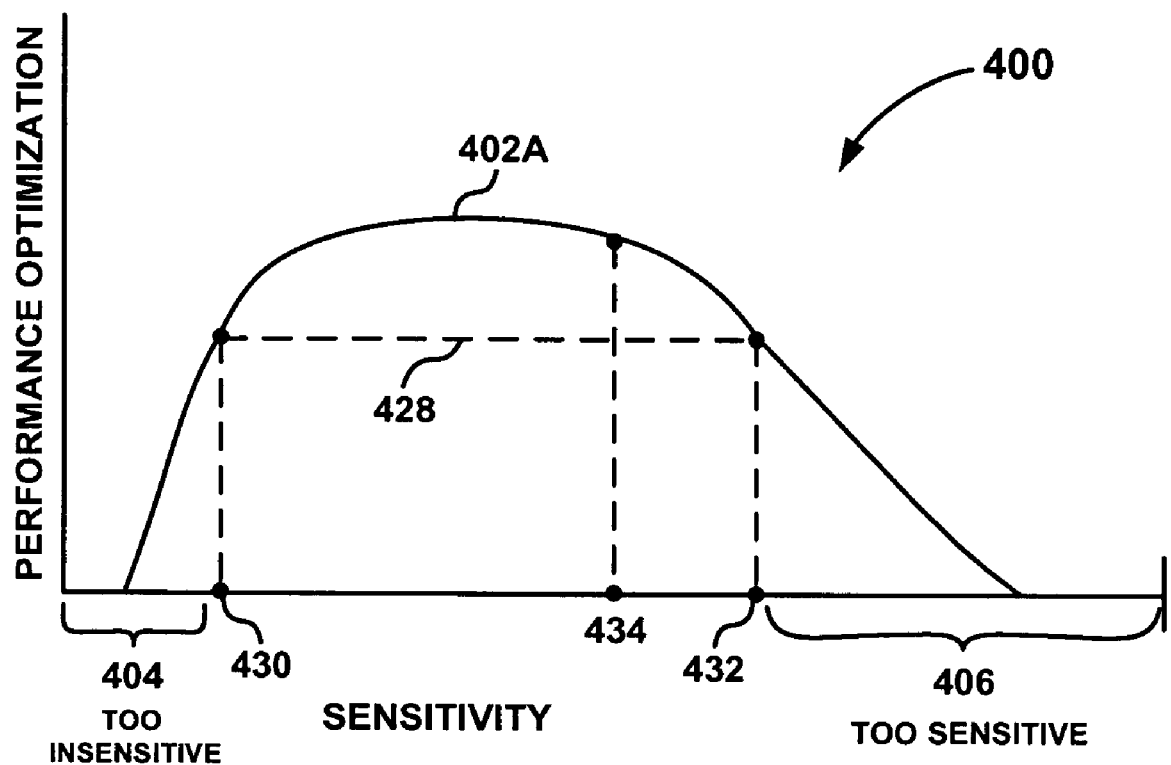
FIG. 4A is a graphical representation of performance optimization versus sensitivity in accordance with embodiments of the present invention.

Referring now to FIG. 4A, a graph 400 of performance optimization versus sensitivity is shown in accordance with embodiments of the present invention. It should be noted that line 402A depicts an exemplary performance optimization curve. Graph 400 also depicts a too insensitive range 404 and a too sensitive range 406. Ranges 404 and 406 will be discussed in detail below. Graph 400 further includes a dotted line 428 corresponding to a desired performance level for a sensor channel. In the example of FIG. 4A, desired performance level 428 intersects performance optimization curve 402A at point 430 (i.e. the upper limit of too insensitive range 404) and at point 432 (i.e. the lower limit of too sensitive range 406). Graph 400 also includes point 434 corresponding to a sensitivity value of a particular sensor channel. In this embodiment, point 434 corresponds to the sensitivity value for sensor channel 202 of FIG. 2. Although such a sensor channel is used in the present embodiment, the present invention is well suited to using various other sensitivity values pertaining to other sensor channels and devices in graph 400.

Figure 4B:
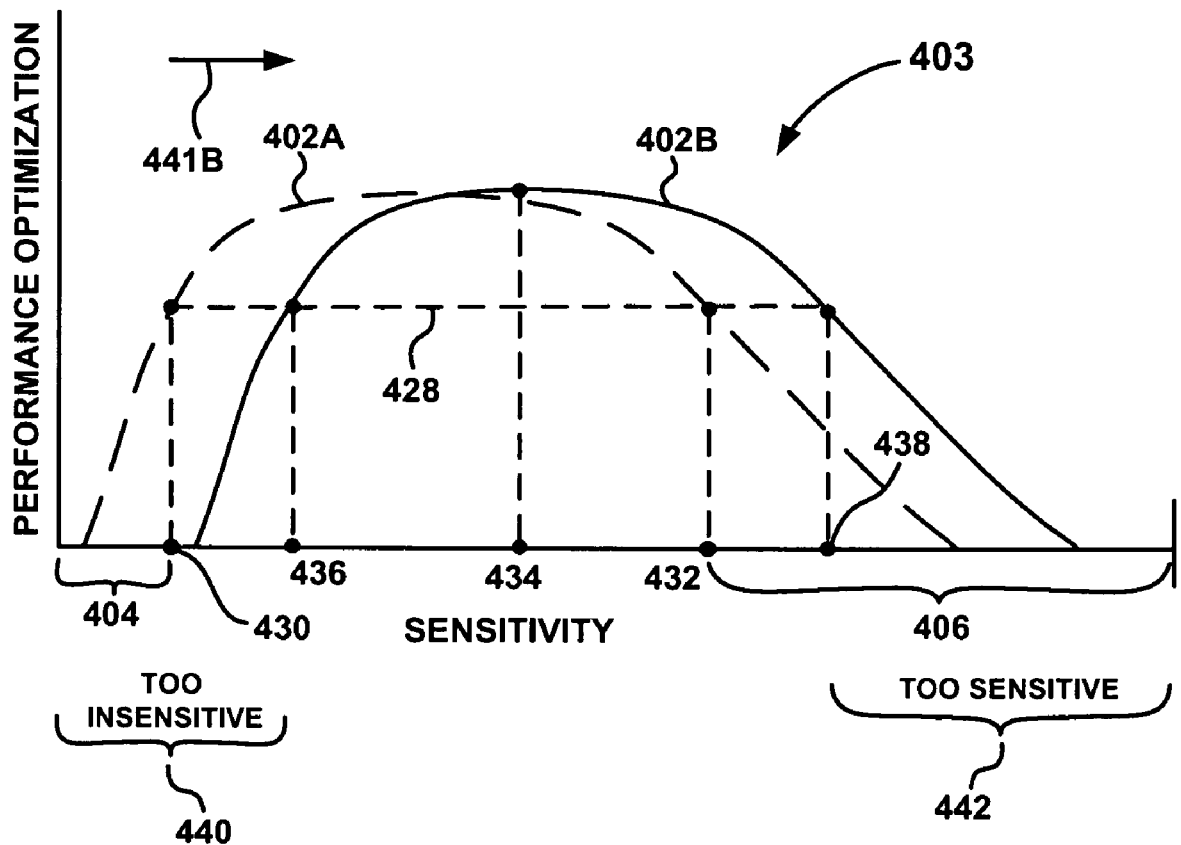
FIG. 4B is a graphical representation of several performance optimizations versus sensitivity wherein the performance optimization curves have been shifted in accordance with embodiments of the present invention.

Referring now to FIG. 4B, a graph 403 of performance optimization versus sensitivity is shown in accordance with embodiments of the present invention. It should be noted that in graph 403, line 402B, depicting an exemplary performance optimization curve, has been shifted to the right from its position shown in FIG. 4A marked as dotted line 402A. Graph 403 further includes dotted line 428 corresponding to a desired performance level for a sensor channel. In the example of FIG. 4B, desired performance level 428 intersects performance optimization curve 402B at sensitivity 436 (i.e. to the right of the upper limit of the too insensitive range 404 of FIG. 4A) and at sensitivity 438 (i.e. to the right of the lower limit of too sensitive range 406 of FIG. 4A). In so doing, a new too insensitive region 440 and a new too sensitive region 442 are created. Graph 403 also includes point 434 corresponding to a sensitivity value of a particular sensor channel for reference and to indicate that the performance level may change as the performance curve is shifted or changed relative to the sensitivity range. The shift of curve 402A relative to curve 402B is indicated by arrow 441B. Once again, in this embodiment, point 434 corresponds to a sensitivity value for sensor channel 202 of FIG. 2. Although such a sensor channel is used in the present embodiment, the present invention is well suited to using various other sensitivity values pertaining to other sensor channels in graph 403. Hence, FIGS. 4A and 4B show that in embodiments in accordance with the present invention, different performance optimizations may be made for different sensitivities and shifted relative to a particular sensor channel sensitivity creating new regions (e.g. regions 440 and 442) which are too insensitive or too sensitive. The performance optimization might include one or more components including: false positive/negative error rates, tolerance for finger size or pressure range, reported position or velocity attributes and their accuracy or resolution, or others.

Figure 4C:
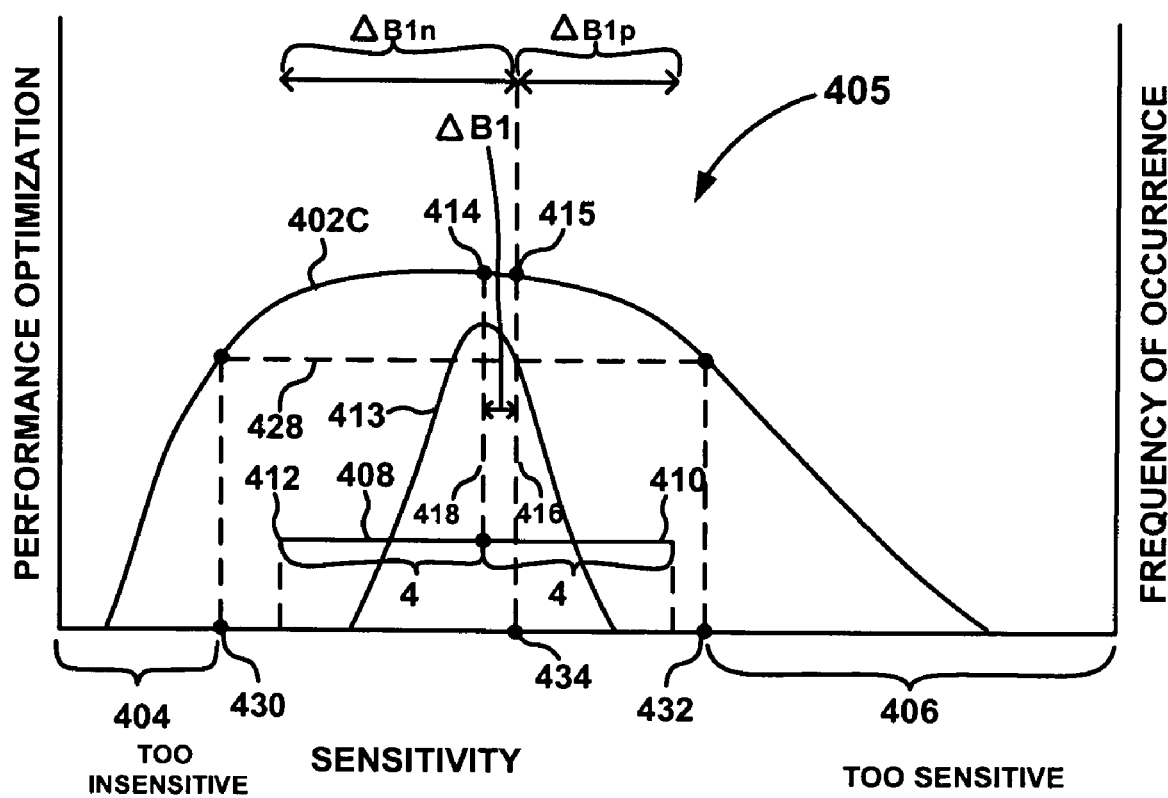
FIG. 4C is a graphical representation of performance optimization versus sensitivity and also depicts both the behavior optimization curve and the frequency of occurrence distribution versus the sensitivity values for a plurality of sensor channels and includes a range of expected variation related to a sensitivity value in accordance with embodiments of the present invention.

Referring now to FIG. 4C, graph 400 of FIG. 4A is now shown including sensitivity data corresponding to the sensor channel (or sensor channels) of the plurality of capacitive sensing devices and is labeled as graph 405. In one embodiment in accordance with the present invention, a range of expected variation 408 is also received. In the present embodiment, range of expected variation 408 should correspond to the range of expected variation shown in FIGS. 1-3. For example, when considering the first group of sensor channels (102, 202, and 302), range of expected variation 408 should correspond to range of expected variation 110 of FIGS. 1-3. Hence, lower limit 412 of range of expected variation 408 should correspond to lower limit 114 of range of expected variation 110. Likewise, upper limit 410 of range of expected variation 408 should correspond to upper limit 112 of range of expected variation 110. In some embodiments in accordance with the present invention, range of expected variation 408 is determined based upon the received sensitivity data. In various other embodiments in accordance with the present invention, range of expected variation 408 is not determined based upon the received sensitivity data. In such embodiments, range of expected variation 408 was acquired from, for example, prior experience, and is simply received. Furthermore, although, many of the following examples of embodiments in accordance with the present invention will explicitly recite determining the range of expected variation based upon the received sensitivity data, it should be understood that various embodiments in accordance with the present invention do not require determining the range of expected variation. The variation range need not be symmetric to a nominal value, and need not correspond to a similar expectation or certainty that a channel will perform within a range. For example, a manufacturing process for a device's channel might operate reliably with 3 standard deviations (σ) from a nominal value for the distribution of parts to one sensitivity (e.g. upper) limit, but might require 5 standard deviations (σ) from a nominal value to operate reliably from the other (e.g. lower) limit. This could be due to asymmetry in the channel sensitivity distribution or the performance optimization curve, the testing or tuning process, or other non-idealities.

Moreover, it should be noted that in various embodiments in accordance with the present invention, in which the present invention does not require determining the range of expected variation, the present invention determines a particular sensor channel's location related to a distribution. Advantageously, embodiments in accordance with the present invention then test that sensor channel at the extremes of desired performance based on the performance optimization curve, rather than at the nominal or at the point of "best performance". Such an embodiment is further described below in conjunction with flow chart 1000 of FIG. 10.

In one embodiment in which the sensitivity data is used to determine the expected range of variation for the sensor channel (or sensor channels), the determination may be made based on the distribution of the received data. Initially, as shown in FIG. 4C, a graphical representation 413 of the distribution of sensitivity values for a plurality of sensor channels on a respective plurality of devices (e.g. first sensor channel 102 of FIG. 1, first sensor channel 202 of FIG. 2, and first sensor channel 302 of FIG. 3) is obtained.

Referring again to FIG. 4C, in one embodiment of the present invention, the data graphically represented in graph 405 by line 413 is compiled as follows. First, sensitivity data corresponding to a plurality of sensor channels of a respective plurality of capacitive sensing devices is received. In one such embodiment, the sensitivity data corresponding to the first sensor channels of the respective plurality of capacitive sensing devices is received first. Next, the sensitivity data corresponding to the second sensor channels of the respective plurality of capacitive sensing devices is received. This process continues until sensitivity data has been received for each grouping of sensor channels of the respective plurality of capacitive sensing devices. In another embodiment in accordance with the present invention, the sensitivity data for all sensor channels of a first capacitive sensing device is received, and then the sensitivity data for all sensor channels of a second capacitive sensing device is received, and the process is repeated until sensitivity data has been received for all capacitive sensing devices of interest. Regardless of the manner in which the sensitivity data is received, embodiments in accordance with the present invention are ultimately able to graphically represent the distribution of the sensitivity values as shown, for example, by line 413 of FIG. 4C as a histogram. Additionally, although FIG. 4C represents a distribution of a grouping of sensor channels (i.e. the first sensor channels of the plurality of first channels of a respective plurality of devices or the second sensor channels, etc.), embodiments in accordance with the present invention are also able to represent various other distributions of interest. Such distributions include, but are not limited to, cumulative sensor channel sensitivities for capacitive sensing devices wherein the sensitivities for all sensor channels of a capacitive sensing device are cumulated, or binned to form a histogram or otherwise statistically interpreted to estimate a nominal value or the limits of expected variation. In embodiments in accordance with the present invention, the sensitivity data is received by sensitivity data receiver 902 of FIG. 9. The method of receiving and/or determining the expected range of variation is discussed below in detail. Note that the performance optimization curve and sensitivity distribution need not be continuous. The performance levels and distribution of received device sensitivities may well be discrete or quantized.

Once the distribution of the sensitivity values for the sensor channels is determined, it is further possible to identify sensor channels along the distribution which correspond to undesirable values. For example, in graph 405 of FIG. 4C, sensor channels having a sensitivity value which falls within range 404 are deemed as being too insensitive. On the other hand, in graph 405, sensor channels having a sensitivity value which falls within range 406 are deemed as being too sensitive. As described above in conjunction with the description of FIG. 1, FIG. 2, and FIG. 3, it should be noted, that in a typical production process, variations in the capacitive sensing devices will cause the sensor channels to have variations in their sensitivity values about the common average or nominal value. Typical variations in capacitive sensing devices include, but are not limited to, plastic cover thickness, adhesive thickness and uniformity, capacitive sensor geometry, electronic variation and numerous other sources of variation. It should be understood, however, that most capacitive sensing devices are designed to be robust to these expected variations. As a result, the sensor channels of the capacitive sensing devices may produce much the same results in terms of, for example button presses or slider and pad actuation, over the range of sensitivity values which can be expected for a typical mass production process. This means that for a given sensor channel there will be a large range of possible performance characteristics for that particular capacitive sensing device which will produce acceptable and nearly indistinguishable behavior either from a user perspective or on the performance optimization curve. This is not an accident, but is instead an intentional property of the capacitive sensing devices to provide functional robustness across real world manufacturing variation.

Referring again to FIG. 4C, as shown in graph 405, the center of the performance optimization curve (depicted by line 402C) is quite flat, making it difficult to find the peak or an optimum robust nominal sensitivity (e.g. over for which the expected limits of variation are farthest from the extremes of desired performance). Moreover, for typical sources of variation, combined randomly from several factors, a normal distribution (or bell curve) of sensor channel sensitivity distribution (e.g. as shown by line 413) is produced. Conventional approaches for testing capacitive sensing devices tend to focus only on producing optimal settings for a sensor channel having a sensitivity value disposed in the center of sensitivity value distribution 413. As will be described below in detail, embodiments in accordance with the present invention, unlike conventional tuning methods, do not solely rely upon performing an analysis of a sensor channel operating with a sensitivity value at or near the center of sensitivity value distribution 413. Instead, embodiments in accordance with the present invention determine capacitive sensing device performance at or near the limits of expected sensor channel variation, or at the extremes of the desired performance.

The methods utilized in accordance with embodiments of the present invention are also useful in instances where the sensitivity value distribution is not bell-shaped or is not even symmetrical. Such a curve is shown, for example in the plot of FIG. 5. In FIG. 5, a graph 500 having an asymmetric sensor channel sensitivity value distribution 513 is shown. Such distributions still present a nominal value such as 525 and limits of expected variation such as 510 and 512. Additionally, as shown in FIG. 5, the too insensitive range 504 and the too sensitive range 506 are of significantly different sizes. As illustrated in graph 500 of FIG. 5, the distribution of sensitivity values of a plurality of capacitive sensing devices may not be bell-shaped, symmetrical, or single peaked, but still presents at least one limit, e.g. lower limit 512 or upper limit 510, to the expected range of variation 508. Hence, even with such an asymmetric distribution of sensitivity values 513 and an asymmetric performance curve 502, the below described embodiments in accordance with the present invention are still applicable and beneficial. Note also that the performance optimization curve need not be symmetric (though it could be) and that it may also have multiple peaks which may have similar or different maximums, but that it still presents at least one performance extreme (e.g. 430 or 432 of FIG. 4).

Referring again to FIG. 4C, the range of expected variation 408 for the sensor channel (or sensor channels) is determined. As stated above, in the present embodiment, range of expected variation 408 may correspond to the range of expected variation shown in FIGS. 1-3. For example, when considering the first group of sensor channels (102, 202, and 302), range of expected variation 408 may correspond to range of expected variation 110 of FIGS. 1-3. Hence, lower limit 412 of range of expected variation 408 should correspond to lower limit 114 of range of expected variation 110. Likewise, upper limit 410 of range of expected variation 408 should correspond to upper limit 112 of range of expected variation 110. In some embodiments in accordance with the present invention, the average and standard deviation ($\sigma$) of sensor channel sensitivity values measured for each sensor are calculated. The sensor channel sensitivity values and the corresponding average and standard deviation are determined using, for example, the data graphically represented in FIG. 1, FIG. 2, FIG. 3. More specifically, in one embodiment, the first sensor channels 102, 202, and 302 of capacitive sensing device A, capacitive sensing device B, and capacitive sensing device C, respectively, can be used to determine the average and standard deviation. Similarly, in one embodiment, the second sensor channels 104, 204, and 304 of capacitive sensing device A, capacitive sensing device B, and capacitive sensing device C, respectively, can be used to determine the average and standard deviation. Finally, in one such embodiment, the third sensor channels 106, 206, and 306 of capacitive sensing device A, capacitive sensing device B, and capacitive sensing device C, respectively can be used to determine the average and standard deviation. Once again, although only three capacitive sensing devices are discussed in the present embodiment, embodiments in accordance with the present invention are well suited to having a fewer or greater number of capacitive sensing devices with a greater or lesser number of sensing channels. In embodiments in accordance with the present invention, a range of expected variation is received by range of expected variation receiver 904 of system 900 all of FIG. 9. It will be seen from FIG. 9, that range of expected variation receiver 904 is coupled to sensitivity data receiver 902. In some embodiments in accordance with the present invention, the range of expected variation is determined based upon the sensitivity data received by sensitivity data receiver 902. In various other embodiments in accordance with the present invention, the range of expected variation is not determined based upon the sensitivity data received by sensitivity data receiver 902. In such embodiments, the range of expected variation is acquired from, for example, prior experience, and is simply received by range of expected variation receiver 904.

Although average and standard deviation are used in determining range of expected variation 408 of FIG. 4C, embodiments in accordance with the present invention are well suited to using various other statistical analysis methods in determining range of expected variation 408 with some confidence level. In one embodiment, range of expected variation 408 is defined as plus and minus four times the standard deviation of the sensor channels. Hence, such an approach defines the span of expected variation 408. That is, as shown in FIG. 4C, in one embodiment in accordance with the present invention, range of expected variation 408 has a total span of $8\sigma$. As shown in FIG. 4C, range of expected variation 408 has an upper limit (i.e. the right end of range of expected variation 408 shown as 410) and a lower limit (i.e. the left end of range of expected variation 408 shown as 412). It will be understood that embodiments in accordance with the present invention are well suited to using various other multiples of the standard deviation or even to using other statistical approaches to define range of expected variation 408. That is, embodiments in accordance with the present invention are well suited to having various other spans for range of expected variation 408 based on a variety of different possible estimations. Additionally, it should be noted that embodiments in accordance with the present invention are also well suited to use in the case where the span of the range of expected variation 408 is not centered about the nominal sensitivity value or the sensitivity value of the sensor channel being considered. That is, embodiments in accordance with the present invention are well suited to cases where a greater or smaller percentage of the span of the range of expected variation 408 is located to the right or to the left of the nominal sensitivity value or the sensitivity value of the sensor channel being considered.

Referring still to FIG. 4C, in one embodiment, once range of expected variation 408 is received (or e.g. computed from the sensitivity data), the present invention then relates range of expected variation 408 for the plurality of first sensor channels (i.e. first sensor channels 102, 202, and 302 of FIG. 1, FIG. 2 and FIG. 3, respectively) to a sensitivity value corresponding to one of the plurality of first sensor channels, that is one of sensor channels 102, 202, and 302. In such an embodiment, range of expected variation 408 is related to a sensitivity value corresponding to one of the plurality of first sensor channels by value relator 908 of FIG. 9. As shown in FIG. 9, value relator 908 is coupled to range of expected variation receiver 904. The performance characteristic of a channel's sensitivity is related to the distribution and the performance limits.

As stated above, although only three sensor channels are being discussed in the present embodiment for purposes of clarity and brevity, embodiments in accordance with the present invention are well suited to having a fewer or greater number of capacitive sensing devices with a fewer or greater number of sensor channels per capacitive sensing device. As shown in FIG. 4C, in this embodiment, point 414 along line 402C, corresponds to a performance characteristic of a nominal sensitivity value for the group of second sensor channels, and point 415 along line 402C corresponds to the operating sensitivity value for first sensor channel 202 of FIG. 2. Hence, the present embodiment relates the operating sensitivity value for sensor channel 202 to the limits of expected variation 410 and 412 over the range 408 as depicted by vertical line 416 for sensitivity 415. More specifically range of variation 408 is located so as to be approximately centered about the sensitivity of 414 where line 418 intersects range of expected variation 408. In so doing, approximately 4σ is disposed to the right of point 414 and approximately 4σ is disposed to the left of point 414.

In accordance with embodiments of the present invention, additional correction factors can be considered when relating the operating value of a sensor channel to the range of expected variation such that the range of variation is not centered about the operating value of the sensor channel to which it is being related. Consider, for example, an embodiment in which sensor channel 202 is known to be 3% more sensitive than an average or a nominal sensitivity for the group of sensor channels (102, 202, and 302), and that the group of sensor channels (102, 202, and 302) had a standard deviation of 5%. Assume that, in such an embodiment, the range of expected variation is again chosen to be plus or minus four standard deviations (4σ). As a result, embodiments in accordance with the present invention would relate the range of expected variation 408 (or one or both limits 410 and 412) to the operating sensitivity 434 and its performance characteristic 415 for sensor channel 202 such that 4σ minus 3% is disposed at 410 to the left of 432 the "too sensitive" performance extreme, but to the right of point 434 where vertical line 416 intersects range of expected variation 408 that the performance characteristic is determined and approximately 4σ plus 3% at 412 is disposed to the left of point 434 but to the right of 430 the "too insensitive" performance extreme. Examples of such relations are shown by the arrows labeled ΔB1$p$ and ΔB1$n$.

Referring still to FIG. 4C, in the present embodiment, range of expected variation 408 (or the variation limits or the extremes of performance) can be related to any one of sensor channels 102, 202, and 302 of FIG. 1, FIG. 2, and FIG. 3, respectively. In one embodiment, the present invention relates range of expected variation 408 to a particular sensor channel based upon sensitivity value variation present in the sensitivity data. More specifically, in embodiments in accordance with the present invention, $\Delta A_1$, $\Delta B_1$, and $\Delta C_1$, corresponding to sensor channels 102, 202, and 302, respectively, are used to determine which of the sensor channels should have its sensitivity value related to range of expected variation 408. As shown in FIG. 1, FIG. 2, and FIG. 3, the sensitivity value variation of sensor 202 (i.e. $\Delta B_1$) is less than the sensitivity value variation of sensor channel 102 (i.e. $\Delta A_1$) and the sensitivity value variation of sensor channel 302 (i.e. $\Delta C_1$). Hence, in the present embodiment, the sensor channel (202) having an operating sensitivity value closest to the nominal sensitivity value (as depicted by dotted line 108) is selected as the appropriate sensor channel to have its sensitivity value related to range of expected variation 408. Although such an approach is used in the present embodiment, embodiments in accordance with the present invention are well suited to other approaches for using sensitivity value variation to determine which sensor channel should have its sensitivity value related to range of expected variation 408. In one such approach, the cumulative sensitivity value variation across all sensor channels of each capacitive sensing device is used to determine which device's sensor channel will have its sensitivity value related to range of expected variation 408 and performance optimization curve 402C. That is, in one approach in accordance with embodiments of the present invention the value of $(\Delta A_1)^2+(\Delta A_2)^2+(\Delta A_3)^2$, the value of $(\Delta B_1)^2+(\Delta B_2)^2+(\Delta B_3)^2$, and the value of $(\Delta C_1)^2+(\Delta C_2)^2+(\Delta C_3)^2$ are compared. The sensor channels corresponding to the capacitive sensing device having the lowest cumulative sensitivity value variation (e.g., the capacitive sensing device having the minimum value for the sum of squares of deviation from the nominal value for all sensor channels thereof) are used as the sensor channels comprising a golden board. Embodiments in accordance with the present invention are also well suited to using various other variations in sensitivity data (or combinations thereof), besides the deviation from the nominal value, to determine which is the appropriate sensor channel to have its sensitivity value related to range of expected variation 408. Thus, embodiments in accordance with the present invention are well suited to selecting one capacitive sensing device to be a golden board (using, for example, the above-listed calculation), and then using all channels of that golden capacitive sensing device to ultimately tune all corresponding sensor channels on other capacitive sensing devices. Further, the above-described benefit is achieved without requiring any additional testing of the other capacitive sensing devices. Also, in so doing, the present invention enables one to fully build out only a single capacitive sensing device (i.e. a golden board), thereby saving the considerable time and expense associated with fully building out and testing additional or even all remaining capacitive sensing devices of interest. This allows the selection of an optimal single tuning of the performance curve relative to sensitivity for all the devices' corresponding channels, binning of the device to a variety of optimal tunings, or individual tuning of each tested device channel as they are related to the device channel with the determined performance characteristic.

Referring again to FIG. 4C, in another embodiment, the present invention relates the range of expected variation 408 to a nominal sensitivity value corresponding to the plurality of first sensor channels. As an example, in such an embodiment, the present invention relates the nominal sensitivity value based on the distribution of the set of first sensor channels as shown by dotted line 108 of FIG. 1 to range of expected variation 408. In such an embodiment, point 414 of graph 405 would correspond to the nominal value given by line 108 for first sensor channels 102, 202, and 302 of FIG. 1, FIG. 2, and FIG. 3, respectively. It should be understood that the embodiments in accordance with the present invention are able to relate various sensitivity values (e.g. nominal sensitivity values, actual sensor channel sensitivity values, adjusted sensor channel sensitivity values, and the like) to a given range of expected variation. In embodiments in accordance with the present invention, the nominal sensitivity value is determined by optional nominal sensitivity determiner 906 of system 900 all of FIG. 9. Also, in such an embodiment, the nominal value is related to range of expected variation 408 by value relator 908 of FIG. 9. As shown in FIG. 9, optional nominal sensitivity determiner 906 is coupled to sensitivity data receiver 902, and value relator 908 is coupled to range of expected variation determiner 904.

Moreover, referring still to FIG. 4C, embodiments in accordance with the present invention are able to select any of the sensor channels from any of the capacitive sensing devices as the appropriate sensor channel to have its sensitivity value related to the limits of expected variation. More generally, embodiments in accordance with the present invention enable the selection of any of the sensor channels (or nominal sensitivity values thereof, or other sensitivity values corresponding thereto) from any of the capacitive sensing devices to be selected as the "golden" sensor channel. As will be discussed below in detail, the selected or "golden" sensor channel (or nominal sensitivity value thereof, or other sensitivity value corresponding thereto) is subsequently used to enable tuning of the remaining performance characteristics of remaining ones of the plurality of first sensor channels of the respective plurality of capacitive sensing devices.

Such an approach has significant benefits associated therewith. By enabling the selection of any of the sensor channels as the golden sensor channel, embodiments in accordance with the present invention do not suffer from the requirements associated with conventional testing methods. Specifically, in embodiments in accordance with the present invention, there is no requirement that any one sensor channel have a sensitivity value which is the same as or even close to the nominal sensitivity value. Hence, even in a limited mass production process where a very small size of candidate capacitive sensing devices is manufactured, embodiments in accordance with the present invention are able to appropriately relate one of the sensor channels (or nominal sensitivity value thereof, or other sensitivity value corresponding thereto) to the limits of expected variation.

In embodiments in accordance with the present invention, once a sensor channel is selected as the golden sensor channel, the sensor channel and its corresponding capacitive device are prepared and mounted to simulate a production state. In so doing, the sensitivity values obtained during subsequent testing (described in detail below) will accurately reflect the results expected from the actual production capacitive sensing devices.

Referring again to FIG. 4C, once the sensor channel (or nominal sensitivity value thereof, or other sensitivity value corresponding thereto) has been related to the range of expected variation, embodiments in accordance with the present invention then determine at least one performance characteristic of the sensor channel near at least one of upper limit 410 and lower limit 412 of range of expected variation 408. In embodiments in accordance with the present invention, the present invention determines at least one performance characteristic of the sensor channel near at least one of upper limit 410 and lower limit 412 of range of expected variation 408 using performance characteristic determiner 910 of FIG. 9. As shown in FIG. 9, performance characteristic determiner 910 is coupled to value relator 908. Where both the upper and lower performance extremes of a channel are determined for a device, these may be used as the expected limits of variation. In this case the device channel performance may be related to a nominal value of the distribution of channels, which is within the range between desired performance extremes.

More specifically, in embodiments in accordance with the present invention, by relating range of expected variation 408 to the operating sensitivity value of sensor channel 202 of FIG. 2, it is possible to determine the performance characteristic of sensor channel 202 near at least one of upper limit 410 and lower limit 412. That is, as shown in FIG. 4C, for sensor channel 202 having an operating sensitivity value shown as 415, it can be seen that at upper limit 410 which is 4σ from operating sensitivity value 414, such an operating sensitivity would not fall within the too sensitive range 406. Hence, for sensor 202 it can be determined that even if it were to operate with a sensitivity value which is 4σ above its nominal operating sensitivity value shown at 414, sensor 202 would still operate in an acceptable manner. Similarly, by relating range of expected variation 408 to the operating sensitivity value of sensor channel 202, when sensor channel 202 has an operating sensitivity value shown as 415, it can be seen that at lower limit 412 which is 4σ from nominal operating sensitivity value 414, such an operating sensitivity would not fall within the too insensitive range 404. Thus, for sensor 202 it can be determined that even if it were to operate with a sensitivity value which is 4σ below its nominal operating sensitivity value shown at 414, sensor 202 would still operate in an acceptable manner.

Once such a determination is made of the performance characteristic (e.g. sensitivity performance) for the sensor channel, embodiments in accordance with the present invention enable utilizing the performance characteristic for the sensor channel to tune performance characteristics of remaining ones of the sensor channels. For example, in one embodiment in accordance with the present invention, it may be determined that the nominal sensitivity value for a group of sensor channels provides unacceptable operation at 4σ above and 4σ below the nominal sensitivity value. In such an embodiment, the performance curve for a channel within group of devices' sensor channels (e.g. sensor channels 102, 202, and 302 comprising the group of first sensor channels) can each be tuned either upwardly or downwardly to exhibit a performance characteristic determined for a particular sensitivity value which represents a shifted range of expected variation. This shifting can be done until a distribution of sensor channel sensitivities provides acceptable operation at 4σ above and 4σ below a nominal sensitivity value. As a result, by examining and testing performance characteristics on a single capacitive sensing device's channel, all remaining capacitive sensing devices can be tuned without requiring additional testing of the remaining capacitive sensing devices. As stated above, in so doing, the present invention enables one to fully build out only a single capacitive sensing device (i.e. a golden board), thereby saving the considerable time and expense associated with fully building out and testing additional or even all remaining capacitive sensing devices of interest.

Moreover, as stated above, in embodiments in accordance with the present invention, any sensor channel from any sensor device can be selected as the golden sensor channel. As a result, embodiments in accordance with the present invention enable any sensor channel, from a group of sensor channels, to be used to tune the remaining ones of the group of sensor channels regardless of which device the sensor channel is located on. As an example, in embodiments in accordance with the present invention, it is possible to tune the group of first sensor channels (i.e. sensor channel 102, sensor channel 202, and sensor channel 302 of FIG. 1, FIG. 2, and FIG. 3, respectively) using sensor channel 202 from capacitive sensing device B. It is also possible to tune the second group of sensor channels (i.e. sensor channel 104, sensor channel 204, and sensor channel 304) using sensor channel 104 from capacitive sensing device A (or using 204 from device B again). Thus, embodiments in accordance with the present invention provide significant flexibility in the testing process. It should be noted, however, that embodiments in accordance with the present invention are also well suited to selecting one capacitive sensing device to be the golden board, and then using all channels of that golden capacitive sensing device to ultimately tune all corresponding sensor channels on other capacitive sensing devices. Further, the above-described benefit is achieved without requiring any additional testing of the other capacitive sensing devices.

It should be understood that although embodiments in accordance with the present invention explicitly recite measuring the response to input of the performance characteristic, embodiments in accordance with the present invention are well suited to determining various other performance characteristics and optimizing their performance for other parameters. Such other performance characteristics may comprise, but are not limited to, accuracy and false-positive and false-negative rates for touch, position or motion. These might depend on the sensitivity or on dynamic range, signal-to-noise ratio, or resolution, as well as, other characteristics.

Figure 4D:
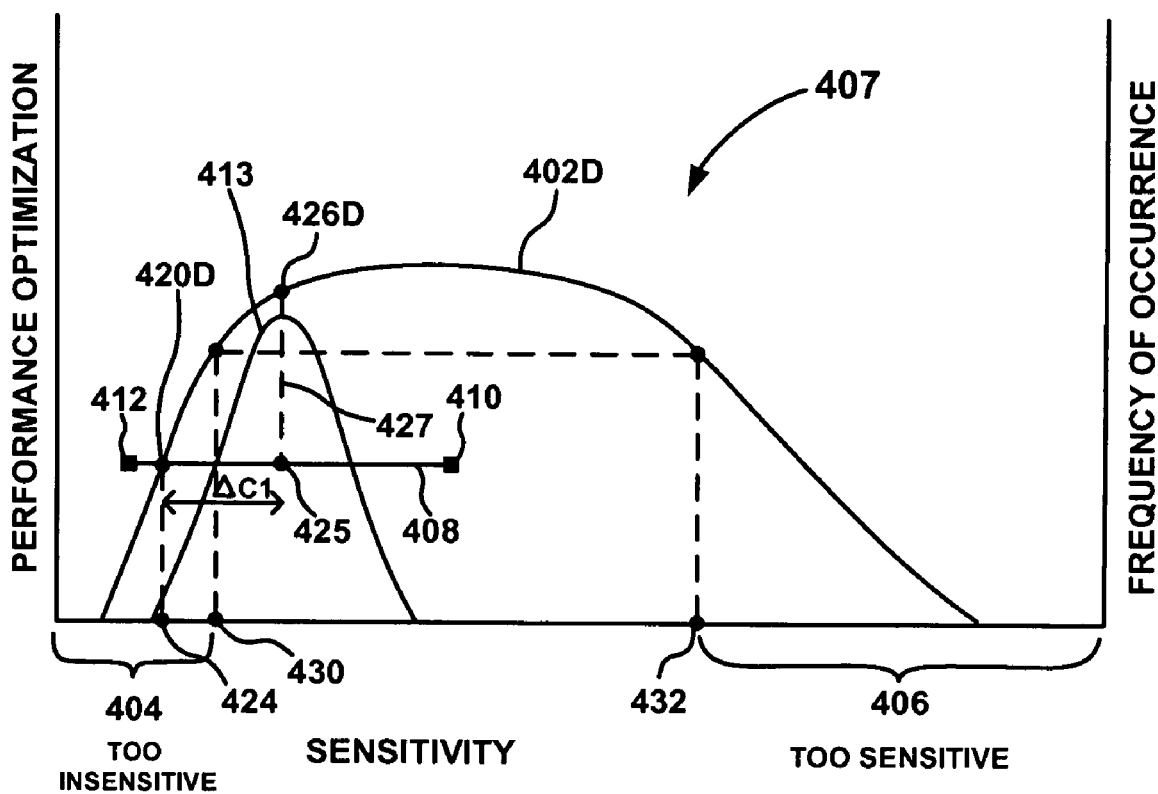
FIG. 4D is a graphical representation of performance optimization versus sensitivity and also depicts both the behavior optimization curve and the frequency of occurrence distribution versus the sensitivity values for a plurality of sensor channels and includes a range of expected variation related to a sensitivity value wherein the lower limit of the range of expected variation is within too insensitive range in accordance with embodiments of the present invention.
Figure 5:
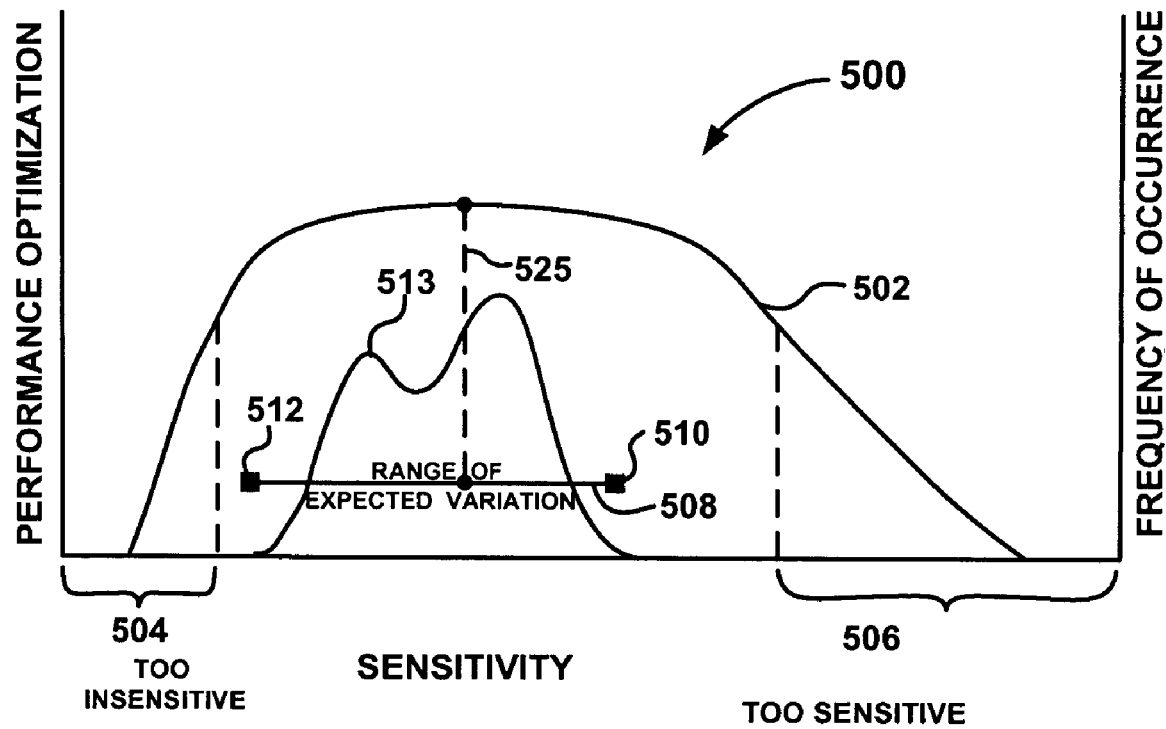
FIG. 5 is a graph showing an asymmetric frequency of occurrence distribution in accordance with embodiments of the present invention.

Referring now to FIG. 4D, for purposes of illustration, graph 407 depicts an embodiment in which sensor channel 302 of FIG. 3 has been related to range of expected variation 408. In this embodiment, it can be seen that sensor channel 302 is found to have a sensitivity value corresponding to point 420D along the performance curve 402D of graph 407. More specifically range of expected variation 408 is located so as to be approximately centered about the point 425, a nominal sensitivity of the distribution, where line 427 intersects range of expected variation 408. In so doing, approximately 4σ is disposed to the right of point 425 and approximately 4σ is disposed to the left of point 425. As shown in FIG. 4D, for sensor channel 302 having a sensitivity value shown as 424, it can be seen that at upper limit of variation 410, which is 4σ plus ΔC, from sensitivity value 424, the sensitivity value would not fall within the too sensitive range 406. Hence, for the first sensor channels it can be determined that even if a channel in the distribution were to operate with a sensitivity value which is 4σ above a nominal operating sensitivity value shown at 425, the sensor would still operate in an acceptable manner. On the other hand, by relating range of expected variation 408 to the sensitivity value of sensor 424 of the first sensor channel of device C (i.e. sensor channel 302), then it can be seen that at lower sensitivity limit 412 which is 4σ from a nominal operating sensitivity value 425 (and 4σ minus ΔC, from 424), such an operating sensitivity would fall within the too insensitive range 404. In fact, the sensitivity value 424 for the first sensor channel of device C falls within the too insensitive range. Thus, for sensor 302 it can be determined that if it were to operate with a sensitivity value which is 4σ below its nominal operating sensitivity value shown at 425, sensor 302 would operate in an unacceptable manner. As a result, in one embodiment in accordance with the present invention, the performance characteristics for sensor channel 302 will need to be adjusted such that sensor channel 302 exhibits an adequate performance characteristic along a tuned performance curve at the lower sensitivity limit. More specifically, performance curve 402D of sensor channel 302 will need to be tuned (e.g. shifted) such that sensor channel 302 exhibits a performance characteristic (e.g. 420D) which is high enough such that when sensor 302 operates at 4a below the upwardly tuned nominal sensitivity value, sensor 302 would operate in an acceptable manner.

Figure 4E:
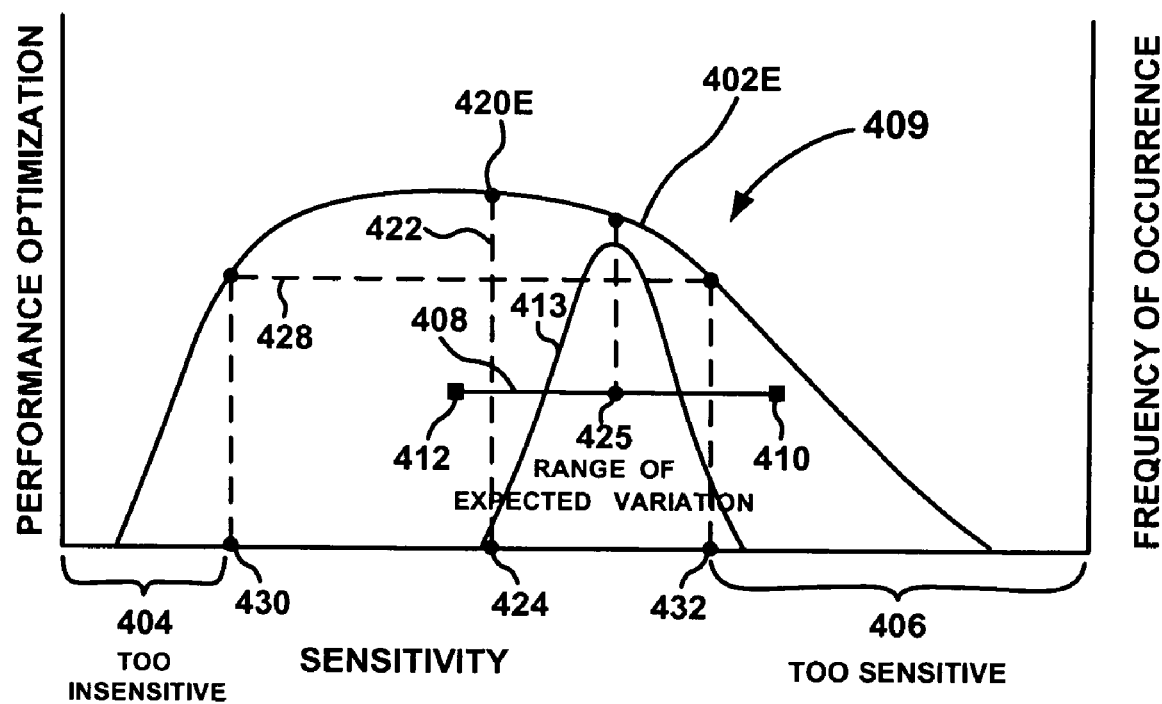
FIG. 4E is a graphical representation of performance optimization versus sensitivity and also depicts both the behavior optimization curve and the frequency of occurrence distribution versus the sensitivity values for a plurality of sensor channels and includes a range of expected variation related to a sensitivity value wherein the upper limit of the range of expected variation is within too sensitive range in accordance with embodiments of the present invention.

Referring now to FIG. 4E, graph 409 is intended to depict an embodiment in which at least one performance characteristic of sensor channel 302 of FIG. 3 has been tuned after determining, as shown in FIG. 4D, that a sensor channel at the lower limit of sensitivity 412 (as well as tested channel 302) would operate in an unacceptable manner when exhibiting its normal (i.e. unadjusted) performance characteristics. In this embodiment, sensor channel 302 has had at least one performance characteristic tuned such that sensor channel 302 exhibits a performance characteristic corresponding to point 420E along line 402E at a sensitivity value 424 on graph 409. Hence, range of expected variation 408 is still located so as to be approximately centered about the point 425 where line 427 intersects range of expected variation 408. As a result, and as was the case in FIG. 4D, approximately 4σ is disposed to the right of point 425 and approximately 4σ is disposed to the left of point 425. By relating range of expected variation 408 and sensor channel 302 (which has had at least one of its performance characteristics tuned such that the first sensor channel 302 of device C with a sensitivity value corresponding to point 424 exhibits the performance characteristic 420E, it can be seen that lower expected sensitivity limit 412 would no longer fall within the too insensitive range 404. Thus, for sensor channel 302 it can be determined that if its performance characteristic was tuned such that sensor channel 302 operates with a sensitivity value corresponding to point 424, the lower limit 412 of range of expected variation 408 would operate in a desired manner. However, as shown in FIG. 4E, if sensor channel 302 has its performance tuned such that sensor channel 302 with sensitivity value 424 exhibits the performance characteristic 420E, it can be seen that at upper limit 410 would fall within the too sensitive range 406. Hence, for sensor channel 302 it can be determined that if its performance characteristic was tuned such that sensor channel 302 operates with a sensitivity value corresponding to point 424 exhibiting the performance characteristic 420E, some devices' channels, within the expected range of variation for sensor channel 302, would still operate in an unacceptable manner. As a result, in one embodiment in accordance with the present invention, at least one performance characteristic for sensor channel 302 will now need to be tuned such that sensor channel 302 will exhibit a higher performance characteristic at a higher sensitivity value. More specifically, at least one performance characteristic of sensor channel 302 will need to be re-tuned such that a first sensor channel will exhibit a performance characteristic that is high enough such that when a first sensor channel operates at 4σ above a nominal sensitivity value 425, the first sensor channel would operate in an acceptable manner. Thus, in embodiments in accordance with the present invention, the process described in conjunction with FIG. 4D and FIG. 4E is repeated by iteratively tuning at least one performance characteristic relative to the sensitivity of sensor channel 302 until sensor channel 302 has a tuned performance curve for which both the upper limit 410 and the lower limit 412 operate in an acceptable manner.

In embodiments in accordance with the present invention, the iterative adjusting process gradually decreases the amount by which the at least one performance characteristic of the sensor channel is tuned during each iteration, until the sensor channel operates in an acceptable manner at both the upper limit and the lower limit of the range of expected variation. As an example, in the embodiment depicted in FIG. 4D, it was found that lower limit 412 of range of expected variation 408 did not operate in an acceptable manner when the performance optimization curve was tuned to 402D for channel sensitivity 424 corresponding to performance characteristic 420. Likewise, in the embodiment depicted in FIG. 4E, it was found that upper limit 410 of range of expected variation 408 did not operate in an acceptable manner when the determined performance optimization curve 402E for channel sensitivity 424 corresponds to performance characteristic 420. Hence, in embodiments in accordance with the present invention, in the next iteration, at least one performance characteristic of sensor channel 302 would be tuned relative to the device sensitivity 424 such that first sensor channel 302 exhibits a performance characteristic greater than the desired performance level for both the sensitivity related to 412 and 410 at the limits of the range 408. In so doing, embodiments in accordance with the present invention enable a user to tune a performance characteristic to a sensor channel of the capacitive device until the sensor channel operates in an acceptable manner at both the upper limit and the lower limit of the range of expected variation such as 402C in FIG. 4C.

Hence, embodiments in accordance with the present invention determine at least one performance characteristic of a sensor channel iteratively at the upper limit and the lower limit of the range of expected variation. Provided the performance characteristic is unsatisfactory at either of the upper limit and the lower limit of the range of expected variation, embodiments in accordance with the present invention adjust (i.e. tune) a performance characteristic relative to the sensitivity of the determining device's sensor channel. This tuning process is then repeated as necessary, and continued until the device's sensor channel operates in an acceptable manner when the performance characteristic is tuned (e.g. shifted) relative to both the upper limit and the lower limit of the range of expected variation relative to the determining device's sensor channel. As a result, embodiments in accordance with the present invention enable a user to tune a sensor channel and its corresponding capacitive sensing device to exhibit the desired behavior for an intended application.

In embodiments in accordance with the present invention, once the method described above is performed for a first group of sensor channels, the method may then repeated for the remaining groups of sensor channels. More specifically, in one embodiment, the above-described method is performed for the group of first sensor channels (sensor channel 102, sensor channel 202, and sensor channel 302). Then, the method is repeated for the group of second sensor channels (sensor channel 104, sensor channel 204, and sensor channel 304). Similarly, the method is repeated for the group of third sensor channels (sensor channel 106, sensor channel 206, and sensor channel 306). It should be noted, however, that embodiments in accordance with the present invention are also well suited to performing the method in various other manners, including, but not limited to, performing the above-described method for enabling the tuning of a capacitive device on a capacitive device by capacitive device basis.

It should be noted that embodiments in accordance with the present invention also provide valuable information regarding the range of expected variation and also the mass production process used to manufacture the capacitive sensing device. As an example, if, for any reason, the range of expected variation is larger than the range of desired behavior (e.g. the range between too insensitive range 404 and too sensitive range 406), it will not be possible to tune the at least one performance characteristic such that the sensor channel will exhibit a sensitivity value wherein the sensor channel operates in an acceptable manner above the desired performance level at both the upper limit and the lower limit of the range of expected variation. In such a case, embodiments in accordance with the present invention suggest to the user that it may be necessary to find a method to reduce the range of expected variation, expand the range of acceptable performance, or to tune the at least one performance characteristics of the sensor channels by bins or individually in production to avoid producing unacceptable behavior among the groups of widely varying sensor channels. The range of expected variation could be reduced by tightened manufacturing tolerances or by selection or binning of parts. For example test limits near the expected variation limits could be set and devices outside the test limits could be discarded or separately tuned. The range of acceptable performance might be changed due to human factors testing or due to improved algorithms. Additionally, in an embodiment in which the range of expected variation is much smaller than the range of acceptable behavior, embodiments in accordance with the present invention suggest to the user that perhaps an opportunity exists to loosen manufacturing tolerances in the mass production process. Hence, such information can provide the user with information which will allow the user to ultimately reduce the cost of the mass production process.

Additionally, the above-described method for enabling the tuning of a capacitive sensing device is well suited to using various methods to generate and collect the sensitivity data. For example, representative fingers can be used to generate a signal on a sensor channel. Additionally, embodiments in accordance with the present invention are well suited to using a well controlled object for generating minimum required activating signal. Such an approach has the advantage of aiding repeatability in the testing process. Similarly, in embodiments in accordance with the present invention, an object for testing maximum allowable non-activating signal aids in testing and measuring sensor channel sensitivity. Embodiments in accordance with the present invention are also well suited to testing sensor channel sensitivity using both user feedback (e.g. audio, visual, tactile etc.) and/or special equipment.

Furthermore, results derived from the above-described method for enabling the tuning a capacitive sensing device can be combined with the effects of noise or quantization effects to create both separate and composite failure and binning criteria for the mass produced capacitive sensing devices.

Figure 6:
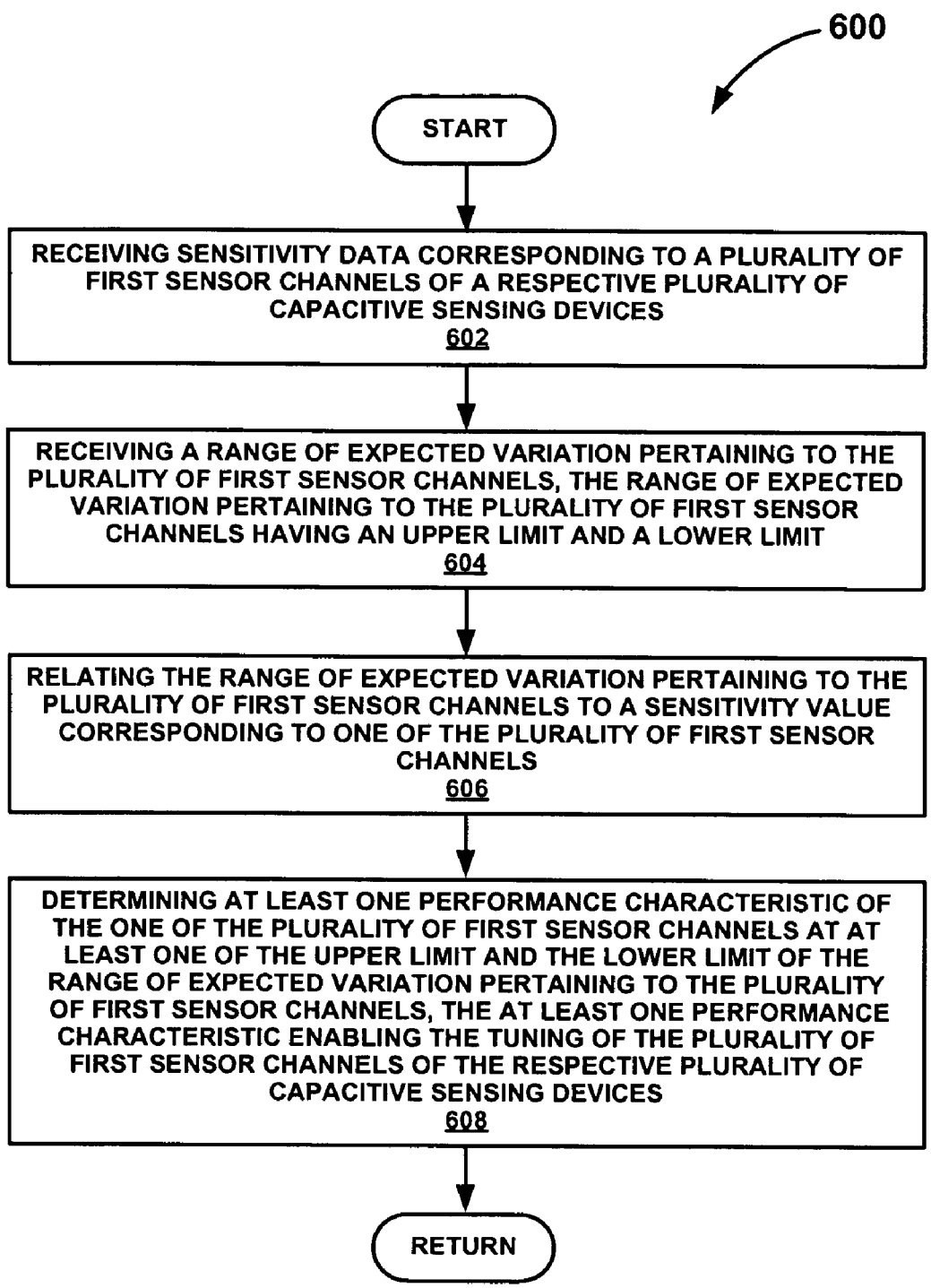
FIG. 6 is a flow chart which recites an embodiment for enabling the tuning of a capacitive sensing device in accordance with embodiments of the present invention.

Referring now to FIG. 6, a flow chart 600 is shown which recites an embodiment in accordance with the above-described method for enabling the tuning of a capacitive sensing device. For purposes of clarity and illustration, the following discussion will describe flow chart 600 in conjunction with one of the embodiments described in detail above. Flow chart 600 is included herein to succinctly and particularly describe the above-described method for enabling the tuning of a capacitive sensing device. As shown in flow chart 600, at 602, embodiments in accordance with the present invention receive sensitivity data (such as that shown in FIGS. 1-3) corresponding to a plurality of first sensor channels (e.g. sensor channel 102, sensor channel 202, and sensor channel 302) of a respective plurality of capacitive sensing devices (capacitive sensing device A, capacitive sensing device B, and capacitive sensing device C, respectively).

At 604, embodiments in accordance with the present invention receive a range of expected variation 408 pertaining to the plurality of first sensor channels. The range of expected variation pertaining to the plurality of first sensor channels has an upper limit 410 and a lower limit 412. In some embodiments in accordance with the present invention, the range of expected variation is determined based upon the sensitivity data received at 602. In various other embodiments in accordance with the present invention, the range of expected variation is not determined based upon the sensitivity data received at 602. In such embodiments, the range of expected variation is acquired from, for example, prior experience, and is simply received at 604. As another example the range of expected (or acceptable) variation could be determined from the measurement of the performance characteristics of a particular device over the desired performance extremes.

Referring now to 606, embodiments in accordance with the present invention relate the range of expected variation pertaining to the plurality of first sensor channels (as denoted by line 408) to a sensitivity value (shown as 415) corresponding to one of the plurality of first sensor channels (sensor channel 202).

At 608, embodiments in accordance with the present invention determine at least one performance characteristic (e.g. positional accuracy, false positive/negative error rates, etc.) of the one of the plurality of first sensor channels (sensor channel 202) near at least one of the upper limit and the lower limit of the range of expected variation pertaining to the plurality of first sensor channels. At 608, the at least one performance characteristic enables tuning (as described in conjunction with the discussion of FIG. 4D and FIG. 4E) of the plurality of first sensor channels of the respective plurality of capacitive sensing devices.

Figure 7:
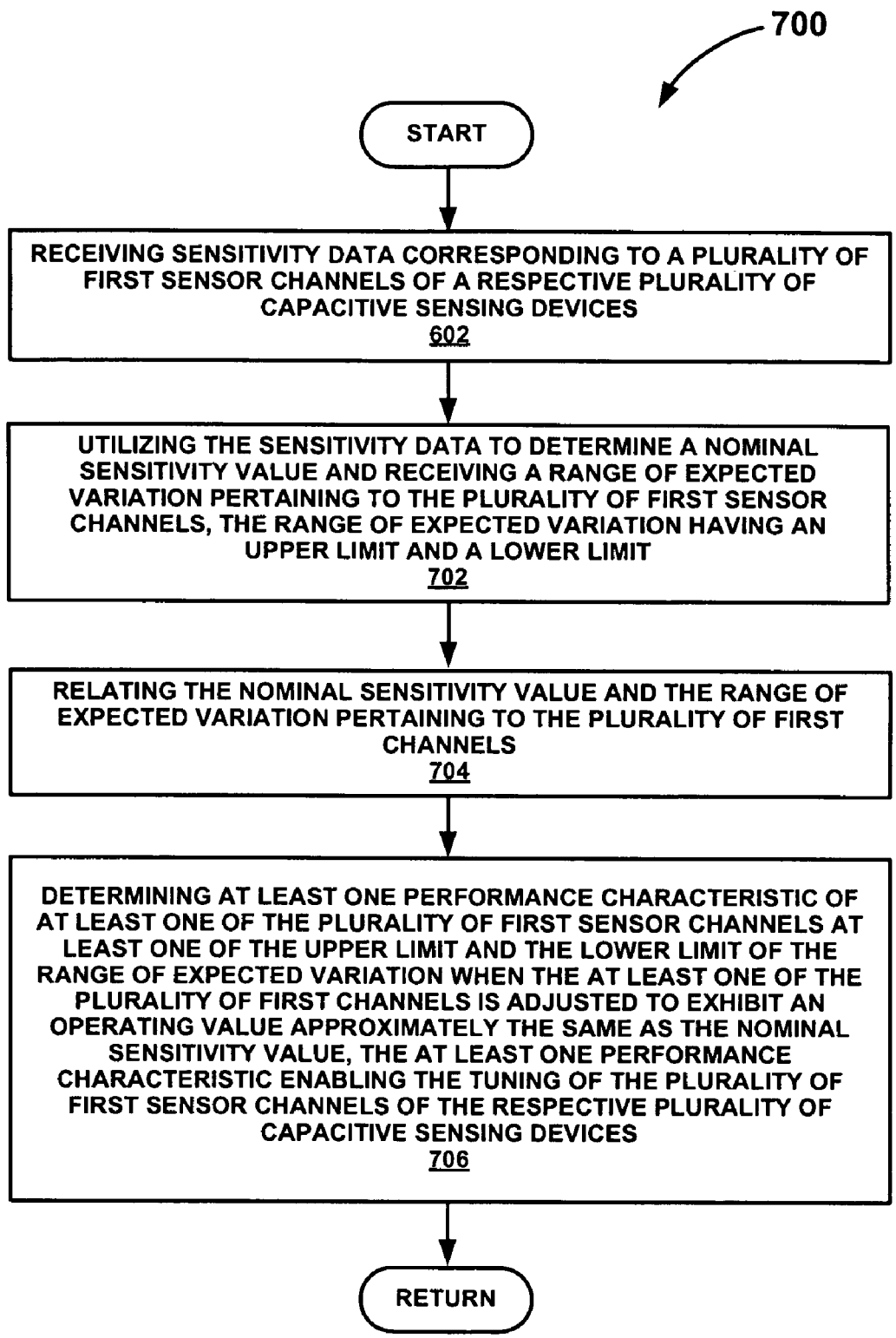
FIG. 7 is a flow chart which recites an embodiment for enabling the tuning of a capacitive sensing device wherein a nominal sensitivity value is related to a range of expected variation in accordance with embodiments of the present invention.

Referring now to FIG. 7, a flow chart 700 is shown which recites another embodiment in accordance with the above-described method for enabling the tuning of a capacitive sensing device. For purposes of clarity and illustration, the following discussion will describe flow chart 700 in conjunction with one of the embodiments described in detail above. Flow chart 700 is included herein to succinctly and particularly describe the above-described method for enabling the tuning of a capacitive sensing device. As shown in flow chart 700, at 602, embodiments in accordance with the present invention receive sensitivity data (such as that shown in FIGS. 1-3) corresponding to a plurality of first sensor channels (e.g. sensor channel 102, sensor channel 202, and sensor channel 302) of a respective plurality of capacitive sensing devices (capacitive sensing device A, capacitive sensing device B, and capacitive sensing device C, respectively).

At 702, embodiments in accordance with the present invention utilize the sensitivity data to determine a nominal sensitivity value (as shown by dotted line 108 of FIGS. 1-3). At 702, embodiments in accordance with the present invention receive a range of expected variation 408 pertaining to the plurality of first sensor channels. The range of expected variation pertaining to the plurality of first sensor channels has an upper limit 410 and a lower limit 412. In some embodiments in accordance with the present invention, the limits of expected variation are determined based upon the sensitivity data received at 702. In various other embodiments in accordance with the present invention, the range of expected variation is not determined based upon the sensitivity data received at 702. In such embodiments, the range of expected variation is acquired from, for example, prior experience, and is simply received at 702.

Referring now to 704, embodiments in accordance with the present invention relate the nominal sensitivity value and the range of expected variation pertaining to the plurality of first sensor channels (as denoted by dotted line 418).

At 706, embodiments in accordance with the present invention determine at least one performance characteristic (e.g. positional accuracy, false positive/negative error rates, etc.) of the one of the plurality of first sensor channels (sensor channel 202) near at least one of the upper limit and the lower limit of the range of expected variation (408) when the at least one of the plurality of first channels (sensor channel 202) has its performance optimization curve tuned or adjusted (e.g. shifted) relative to the determining channel approximately the same amount and direction as the difference between the determining sensor channel's received sensitivity value and the received limit of expected variation. As a result, the at least one performance characteristic enables the tuning of the performance of the plurality of first sensor channels of the respective plurality of capacitive sensing devices (as described in conjunction with the discussion of FIG. 4D and FIG. 4E).

Figure 8:
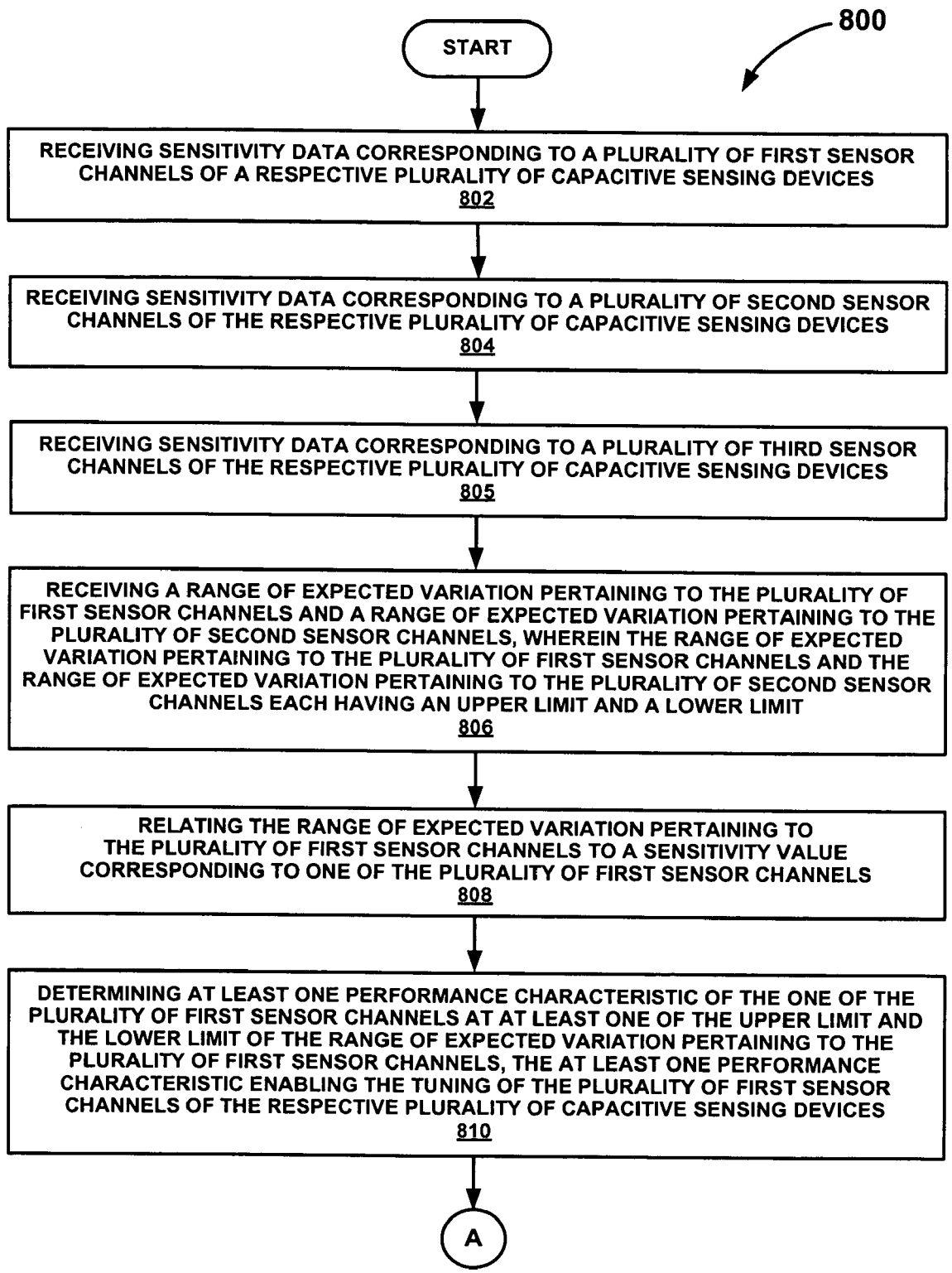
FIG. 8 is a flow chart which recites an embodiment for enabling the tuning of a plurality of sensor channels of a capacitive sensing device in accordance with embodiments of the present invention.
Figure 8:
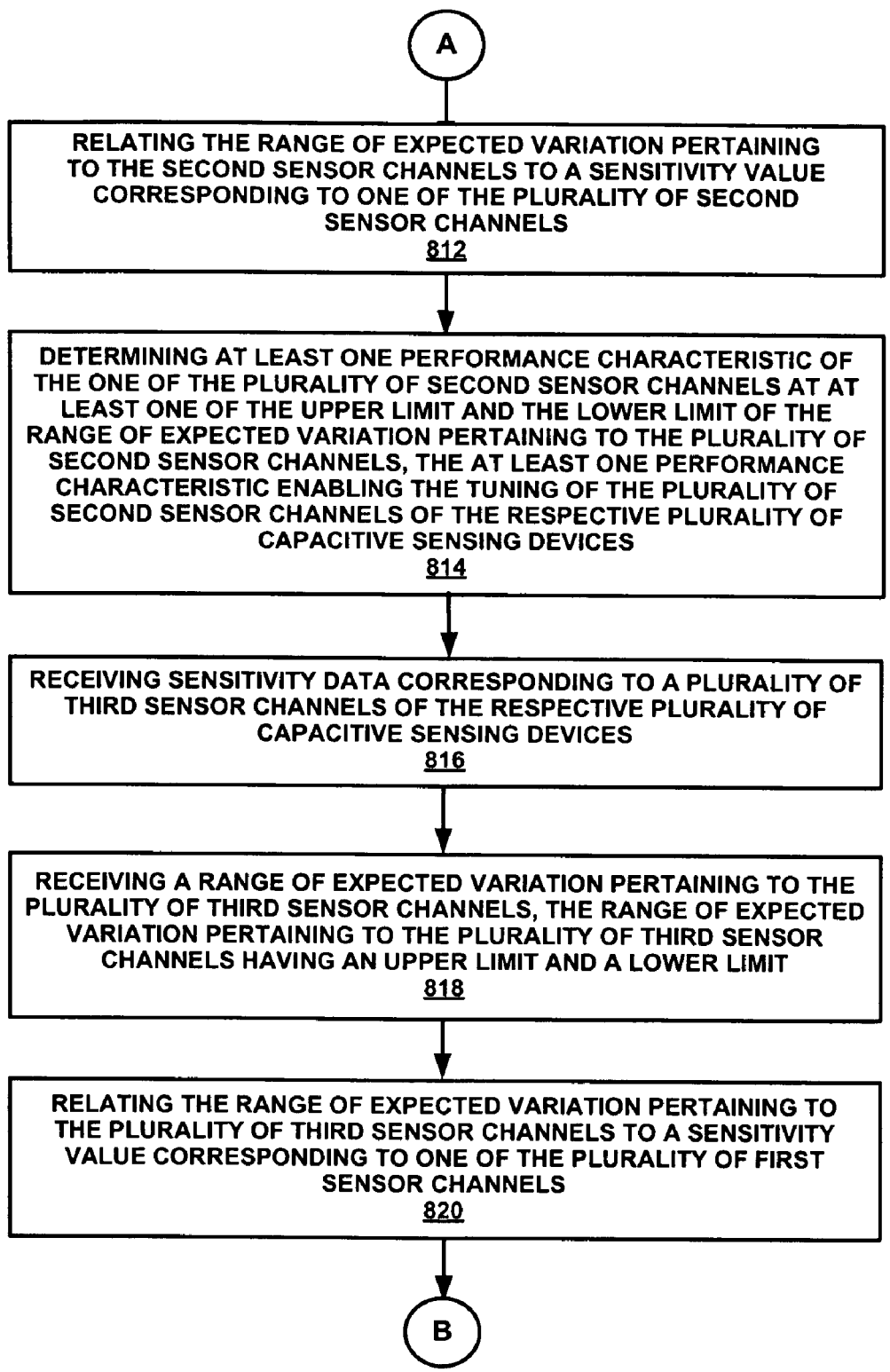
Figure 8:
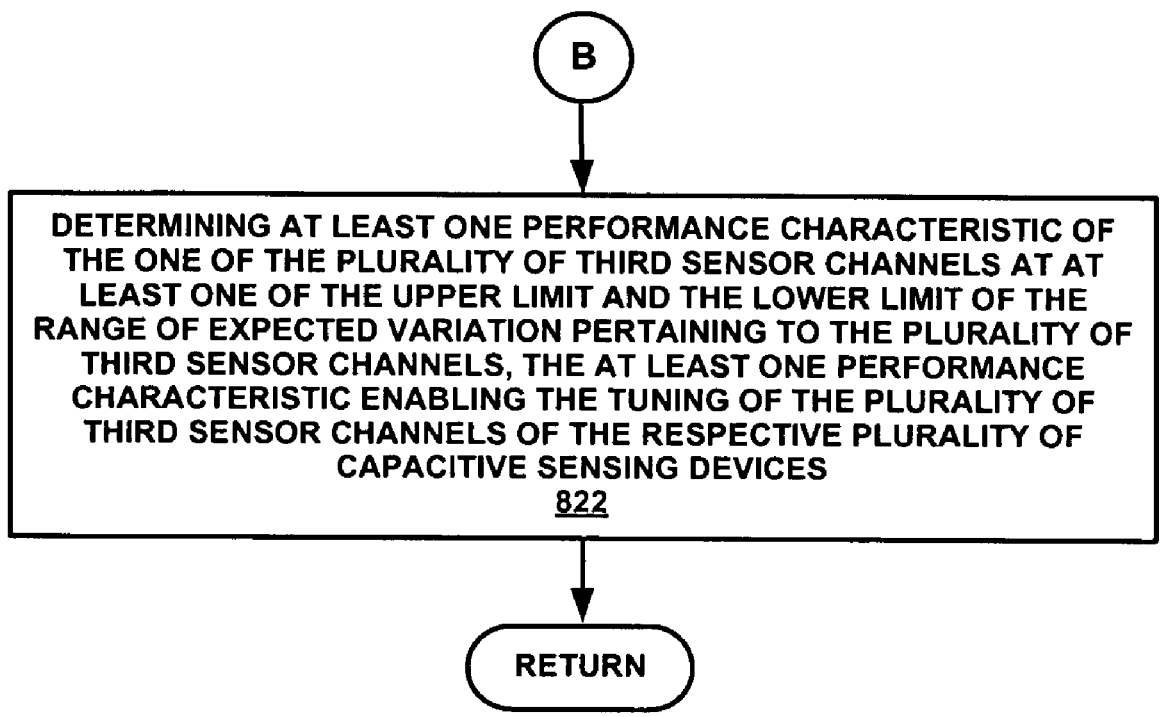

Referring now to FIG. 8, a flow chart 800 is shown which recites an embodiment in accordance with the above-described method for enabling the tuning of a capacitive sensing device. Specifically, in this embodiment, the method for enabling the tuning of a plurality of first, second, and third sensor channels is described. Once again, for purposes of clarity and illustration, the following discussion will describe flow chart 800 in conjunction with one of the embodiments described in detail above. Flow chart 800 is included herein to succinctly and particularly describe the above-described method for enabling tuning of a capacitive sensing device. It should be noted that embodiments in accordance with the present invention are well suited to use with fewer or greater number of plurality of sensor channels. Also, embodiments in accordance with the present invention are well suited to having any number sensor channels comprising the plurality of sensor channels.

As shown in flow chart 800, at 802, embodiments in accordance with the present invention receive sensitivity data (such as that shown in FIGS. 1-3) corresponding to a plurality of first sensor channels (e.g. sensor channel 102, sensor channel 202, and sensor channel 302) of a respective plurality of capacitive sensing devices (capacitive sensing device A, capacitive sensing device B, and capacitive sensing device C, respectively).

At 804, embodiments in accordance with the present invention receive sensitivity data (such as that shown in FIGS. 1-3) corresponding to a plurality of second sensor channels (e.g. sensor channel 104, sensor channel 204, and sensor channel 304) of a respective plurality of capacitive sensing devices (capacitive sensing device A, capacitive sensing device B, and capacitive sensing device C, respectively).

At 805, embodiments in accordance with the present invention receive sensitivity data (such as that shown in FIGS. 1-3) corresponding to a plurality of third sensor channels (e.g. sensor channel 106, sensor channel 206, and sensor channel 306) of a respective plurality of capacitive sensing devices (capacitive sensing device A, capacitive sensing device B, and capacitive sensing device C, respectively).

At 806, embodiments in accordance with the present invention receive a range of expected variation (e.g. range of expected variation 408) pertaining to the plurality of first sensor channels. The range of expected variation pertaining to the plurality of first sensor channels has an upper limit 410 and a lower limit 412. Additionally at 806, embodiments in accordance with the present invention utilize the sensitivity data to determine a range of expected variation (e.g. range of expected variation 408) for the plurality of second sensor channels. The range of expected variation pertaining to the plurality of second sensor channels has an upper limit 410 and a lower limit 412. In some embodiments in accordance with the present invention, the range of expected variation is determined based upon the sensitivity data received at 802. In various other embodiments in accordance with the present invention, the range of expected variation is not determined based upon the sensitivity data received at 802. In such embodiments, the range of expected variation is acquired from, for example, prior experience, and is simply received at 806.

Referring now to 808, embodiments in accordance with the present invention relate the distribution (or parameters describing the distribution such as a nominal value and expected limits of variation) pertaining to the plurality of first sensor channels (e.g. as denoted by dotted line 416) to a particular received sensitivity value (e.g. as shown as 415) corresponding to one of the plurality of first sensor channels (sensor channel 202).

At 810, embodiments in accordance with the present invention determine at least one performance characteristic (e.g. positional accuracy) of the one of the plurality of first sensor channels (sensor channel 202) near at least one of the upper limit and the lower limit of the range of expected variation pertaining to the plurality of first sensor channels. At 810, the at least one performance characteristic enables tuning (as described in conjunction with the discussion of FIG. 4D and FIG. 4E) of the plurality of first sensor channels of the respective plurality of capacitive sensing devices.

Referring now to 812, embodiments in accordance with the present invention relate the range of expected variation pertaining to the plurality of second sensor channels (e.g. as denoted by dotted line 416) to a sensitivity value (e.g. as shown as 415) corresponding to one of the plurality of second sensor channels (sensor channel 204).

At 814, embodiments in accordance with the present invention determine at least one performance characteristic (e.g. the sensitivity value) of the one of the plurality of second sensor channels (sensor channel 204) near at least one of the upper limit and the lower limit of the range of expected variation pertaining to the plurality of second sensor channels. At 814, the at least one performance characteristic enables tuning (as described in conjunction with the discussion of FIG. 4D and FIG. 4E) of the plurality of second sensor channels of the respective plurality of capacitive sensing devices.

At 818, embodiments in accordance with the present invention receive a range of expected variation (e.g. range of expected variation 408) pertaining to the plurality of third sensor channels. The range of expected variation pertaining to the plurality of third sensor channels has an upper limit 410 and a lower limit 412. In some embodiments in accordance with the present invention, the range of expected variation is determined based upon the sensitivity data received at 805. In various other embodiments in accordance with the present invention, the range of expected variation is not determined based upon the sensitivity data received at 805. In such embodiments, the range of expected variation is acquired from, for example, prior experience, and is simply received at 818.

Referring now to 820, embodiments in accordance with the present invention relate the range of expected variation pertaining to the plurality of third sensor channels (e.g. as denoted by dotted line 416) to a sensitivity value (e.g. as shown as 414) corresponding to one of the plurality of third sensor channels (sensor channel 206).

At 822, embodiments in accordance with the present invention determine at least one performance characteristic (e.g. the sensitivity value) of the one of the plurality of third sensor channels (sensor channel 206) near at least one of the upper limit and the lower limit of the range of expected variation pertaining to the plurality of third sensor channels. At 822, the at least one performance characteristic enables tuning (as described in conjunction with the discussion of FIG. 4D and FIG. 4E) of the plurality of third sensor channels of the respective plurality of capacitive sensing devices.

Figure 10:
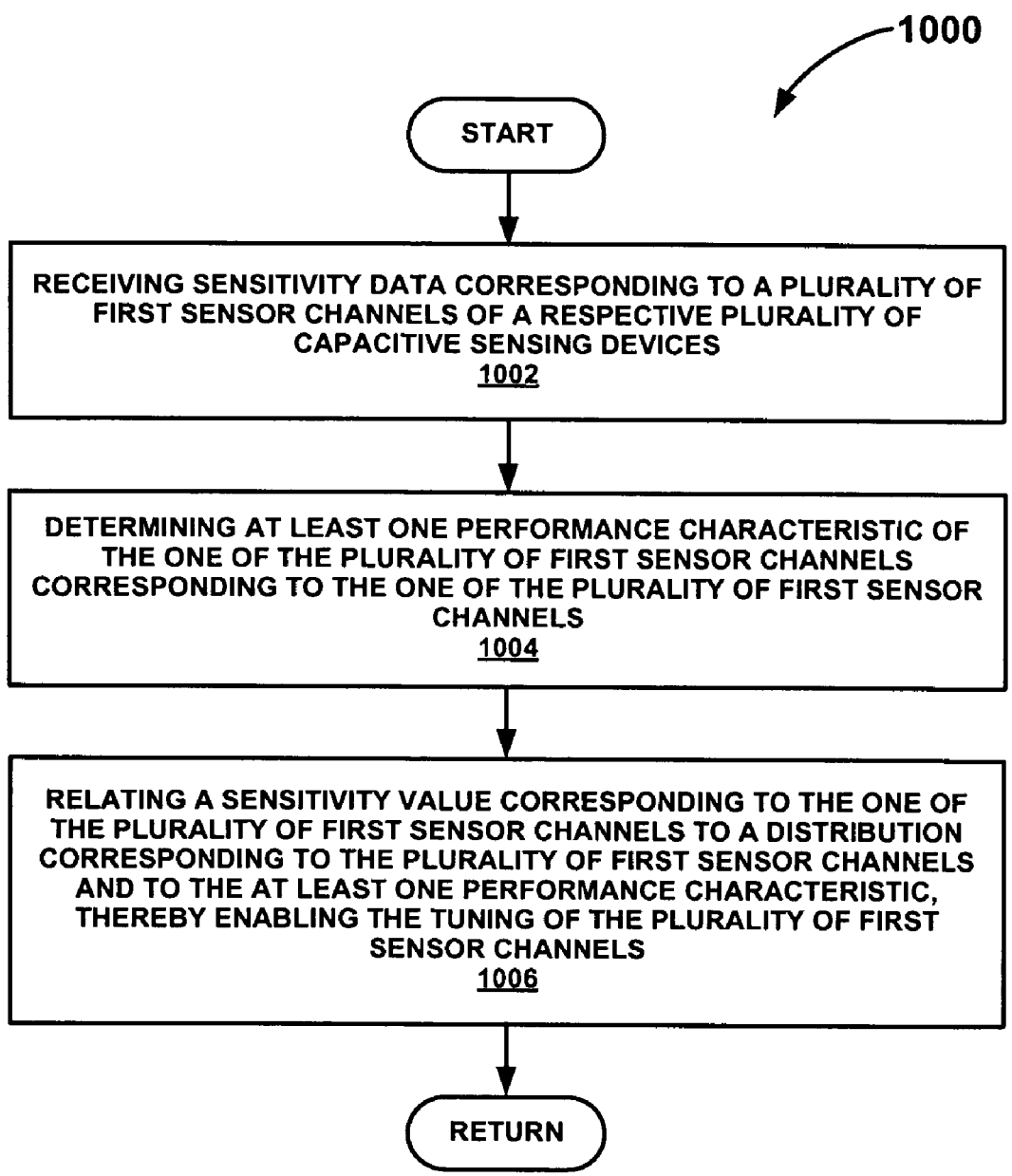
FIG. 10 is a flow chart which recites an embodiment for enabling the tuning of a plurality of sensor channels of a capacitive sensing device in accordance with embodiments of the present invention.
Figure 11:
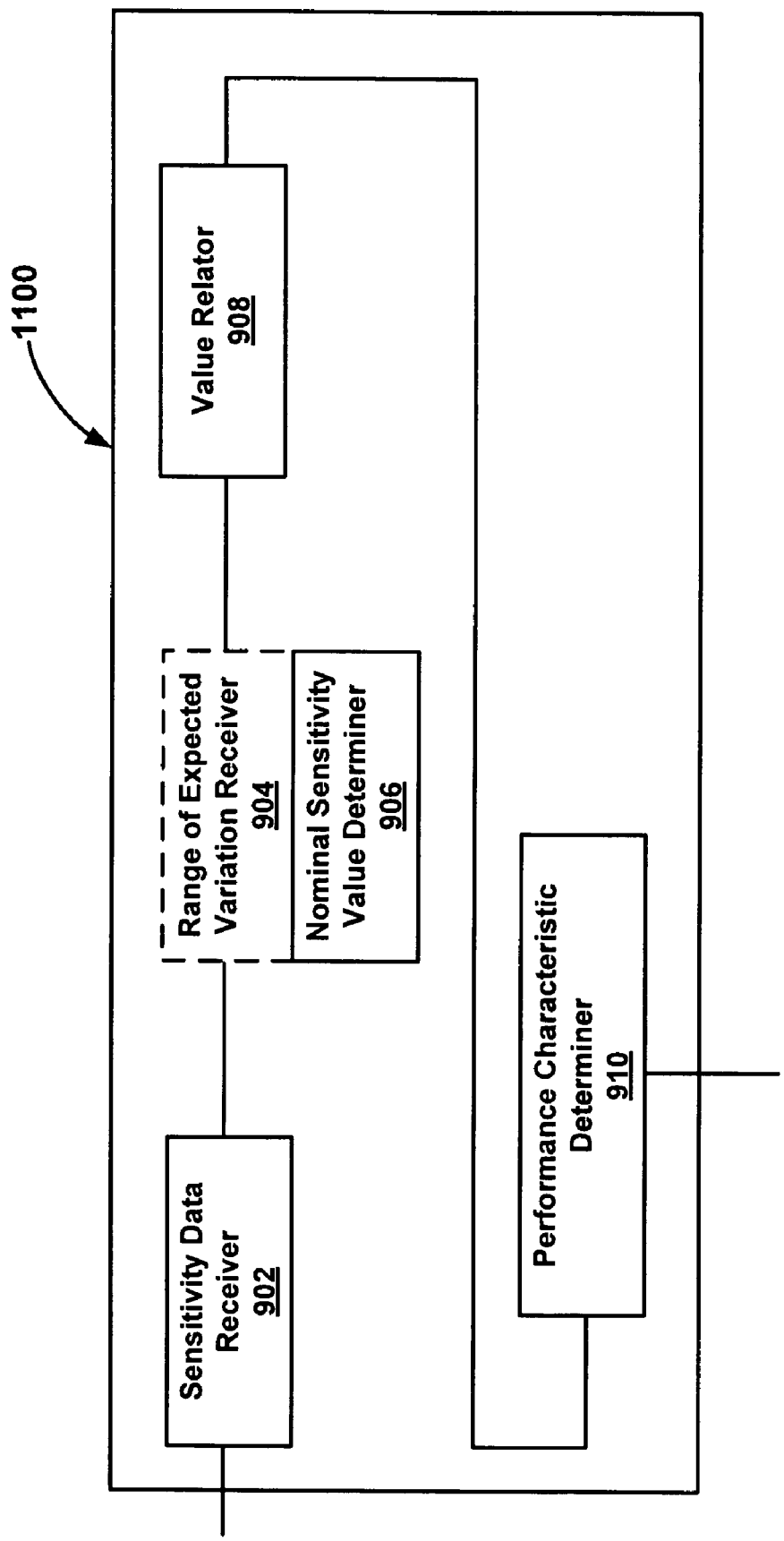
FIG. 11 is a system diagram which can be implemented in software, firmware, hardware, or any combination thereof for performing a method for enabling the tuning of a capacitive sensing device.

Referring now to FIG. 10, a flow chart 1000 is shown which recites an embodiment in accordance with the above-described method for enabling the tuning of a capacitive sensing device. Flow chart 1000 is included herein to succinctly and particularly describe the above-described method for enabling the tuning of a capacitive sensing device. As shown in flow chart 1000, at 1002, embodiments in accordance with the present invention receive sensitivity data (such as that shown in FIGS. 1-3) corresponding to a plurality of first sensor channels (e.g. sensor channel 102, sensor channel 202, and sensor channel 302) of a respective plurality of capacitive sensing devices (capacitive sensing device A, capacitive sensing device B, and capacitive sensing device C, respectively). In embodiments in accordance with the present invention, the sensitivity data is received by sensitivity data receiver 902 of FIG. 11.

Referring now to 1004, embodiments in accordance with the present invention determine at least one performance characteristic of one of the plurality of first sensor channels (e.g. sensor channel 202) corresponding to the plurality of first sensor channels (e.g. first sensor channels 102, 202, and 302). More specifically, as shown, for example, in FIG. 4F, the present embodiment determines at least one performance characteristic at, for example, point 415. It will be understood that point 415 corresponds to one extreme where the vertical line extending from point 434 intersects near the level of desired performance shown by line 428. Also, in embodiments in accordance with the present invention, the determination of the at least one performance characteristic is performed, for example, by performance characteristic determiner 910 of FIG. 11.

Referring still to 1004, in embodiments in accordance with the present invention, the determining of the at least one performance characteristic of one of the plurality of first sensor channels comprises determining a first performance extreme corresponding to one of the plurality of first sensor channels. That is, in one embodiment in accordance with the present invention, the at least one performance characteristic is determined at the first of two performance extremes corresponding to the first sensor channel. Furthermore, in another embodiment in accordance with the present invention, the at least one performance characteristic is determined at or near the second of the two performance extremes corresponding to the first sensor channel. Also, it should be understood that in various embodiments in accordance with the present invention, the first and second performance extremes correspond to the upper and lower limits of the distribution (e.g. distribution 470).

Figure 4F:
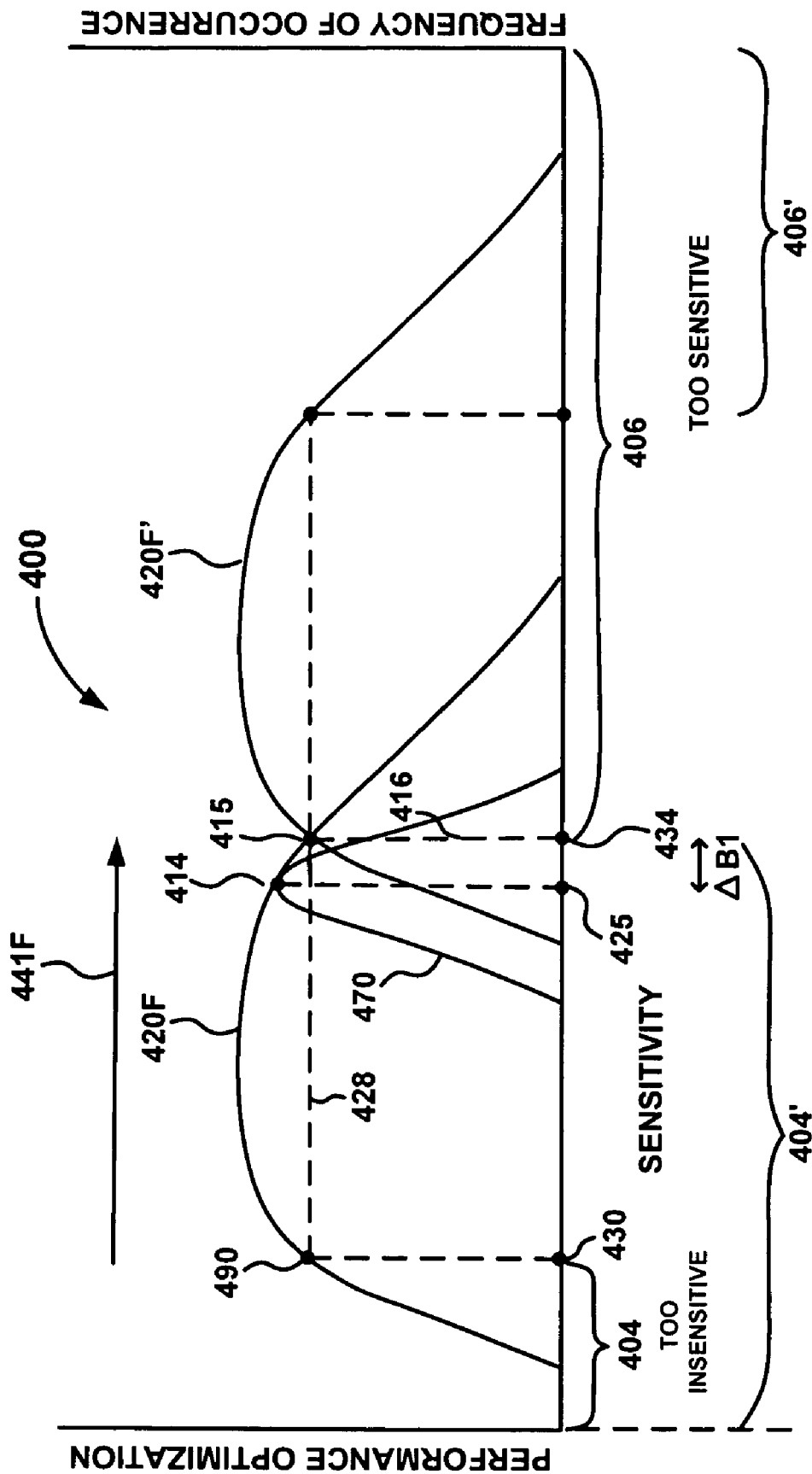
FIG. 4F is a graphical representation of performance optimization versus sensitivity and also depicts the sensitivity values for a plurality of sensor channels versus the behavior optimization or frequency of occurrence for each sensitivity value and depicts testing at least one performance characteristic (e.g. the sensitivity value) of one of the plurality of sensor channels at one of the extreme values of the distribution pertaining to the plurality of sensor channels in accordance with embodiments of the present invention.

At 1006, embodiments in accordance with the present invention relate a sensitivity value (shown, for example as 430 in FIG. 4F) corresponding to one of the plurality of first sensor channels to a distribution corresponding to the plurality of first sensor channels (shown, for example, as 470 in FIG. 4F) and to the at least one performance characteristic determined above at 1004. Similarly, embodiments in accordance with the present invention are also well suited to determining at least one performance characteristic at or near point 415. It will be understood that point 415 corresponds to another extreme where the vertical line extending from point 415 intersects line 428. In so doing, embodiments in accordance with the present invention thereby enable tuning (as described in conjunction with the discussion of FIG. 4D and FIG. 4E) of the plurality of first sensor channels of the respective plurality of capacitive sensing devices. A graphical example of the tuning in FIG. 4F is the shifting of line 402F to line 402F' by the amount equal to distance between intersections of the performance curve 420F and the line 428 representing desired performance indicated by arrow 441F. In so doing, a new too insensitive region 404' and a new too sensitive region 406' are created. Also, in embodiments in accordance with the present invention, the relating of a sensitivity value to a distribution and to the at least one performance characteristic is performed on at least one performance optimization curve, for example, by value relator 908 of FIG. 11. It should be noted that system 1100 of FIG. 11 varies from the system 900 of FIG. 9 in that nominal sensitivity determiner 906 is not optional in FIG. 11, and that range of expected variation receiver 904 is optional in FIG. 11.

Referring again to 1006, in various embodiments in accordance with the present invention, the relating of a sensitivity value corresponding to one of the plurality of first sensor channels to a distribution corresponding to the plurality of first sensor channels and to the at least one performance characteristic is based upon sensitivity value variation present in the sensitivity data. More specifically, as shown in FIG. 1, FIG. 2, and FIG. 3, the sensitivity value variation of sensor 202 (i.e. $\Delta B_1$) is less than the sensitivity value variation of sensor channel 102 (i.e. $\Delta A_1$) and the sensitivity value variation of sensor channel 302 (i.e. $\Delta C_1$). Hence, in one embodiment, the sensor channel (202) having an operating sensitivity value closest to the nominal sensitivity value (as depicted by dotted line 108) is selected as the appropriate sensor channel to have its sensitivity value related to the distribution corresponding to the plurality of first sensor channels and to the at least one performance characteristic. Although such an approach is used in the present embodiment, embodiments in accordance with the present invention are well suited to other approaches for using sensitivity value variation to determine which sensor channel should have its sensitivity value related to the distribution corresponding to the plurality of first sensor channels and to the at least one performance characteristic. In one such approach, the cumulative sensitivity value variation across all sensor channels of each capacitive sensing device is used to determine which sensor channel of which devices' sensing channels will have its sensitivity value related to the distribution corresponding to the plurality of first sensor channels and to the at least one performance characteristic.

Referring still to 1006, embodiments in accordance with the present invention are also well suited to arbitrarily selecting one of the plurality of first sensor channels as the appropriate sensor channel to have its sensitivity value related to the distribution corresponding to the plurality of first sensor channels and to the at least one performance characteristic on the performance optimization curve.

Figure 12:
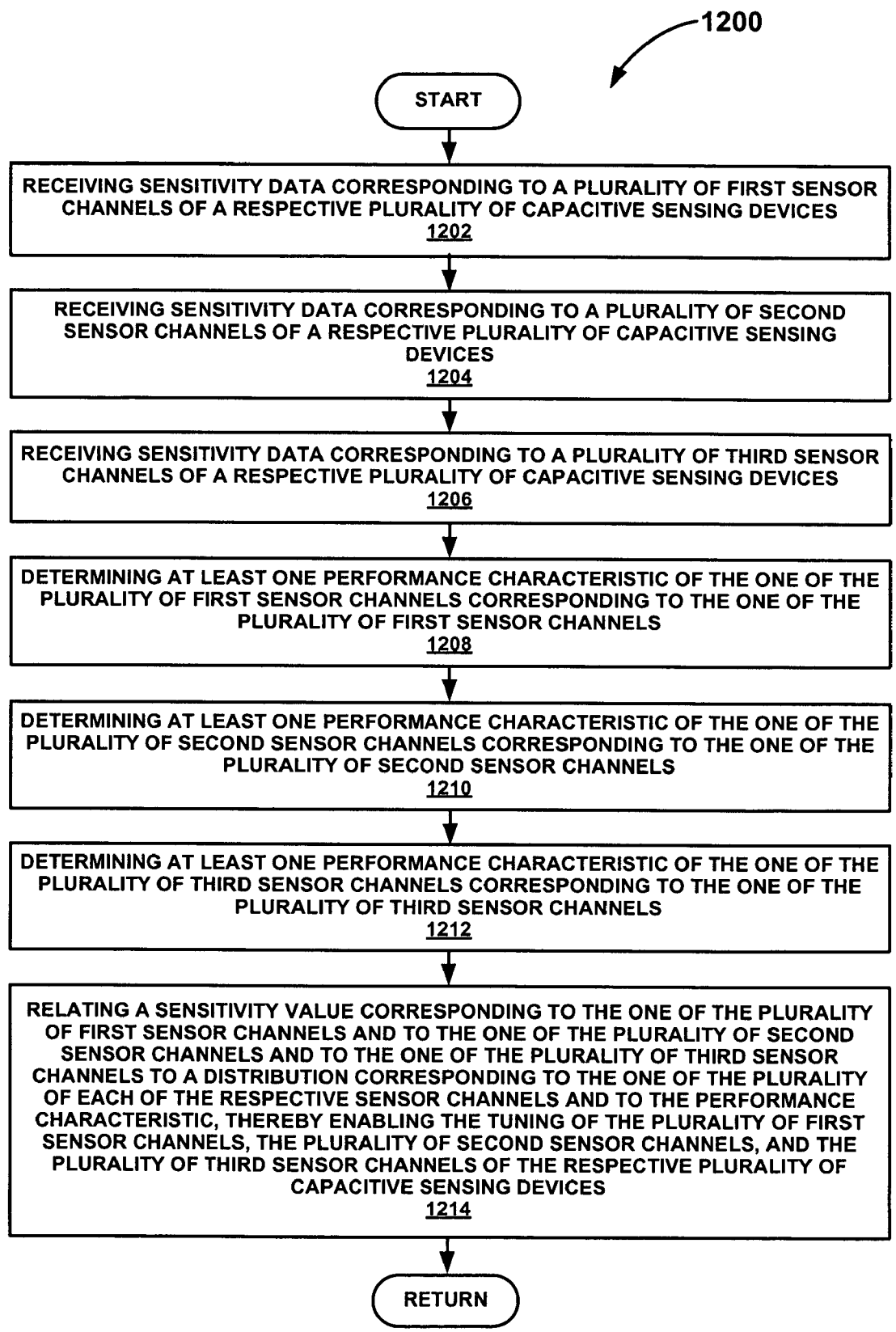
FIG. 12 is a flow chart which recites an embodiment for enabling the tuning of a plurality of sensor channels of a capacitive sensing device in accordance with embodiments of the present invention.

Referring now to FIG. 12, a flow chart 1200 is shown which recites an embodiment in accordance with the above-described method for enabling the tuning of a capacitive sensing device. Flow chart 1200 is included herein to succinctly and particularly describe the above-described method for enabling the tuning of a capacitive sensing device. As shown in flow chart 1200, at 1202, embodiments in accordance with the present invention receive sensitivity data (such as that shown in FIGS. 1-3) corresponding to a plurality of first sensor channels (e.g. sensor channel 102, sensor channel 202, and sensor channel 302) of a respective plurality of capacitive sensing devices (capacitive sensing device A, capacitive sensing device B, and capacitive sensing device C, respectively). In embodiments in accordance with the present invention, the sensitivity data is received by sensitivity data receiver 902 of FIG. 11.

At 1204, embodiments in accordance with the present invention receive sensitivity data (such as that shown in FIGS. 1-3) corresponding to a plurality of second sensor channels (e.g. sensor channel 104, sensor channel 204, and sensor channel 304) of a respective plurality of capacitive sensing devices (capacitive sensing device A, capacitive sensing device B, and capacitive sensing device C, respectively). In embodiments in accordance with the present invention, the sensitivity data is received by sensitivity data receiver 902 of FIG. 11.

At 1206, embodiments in accordance with the present invention receive sensitivity data (such as that shown in FIGS. 1-3) corresponding to a plurality of third sensor channels (e.g. sensor channel 106, sensor channel 206, and sensor channel 306) of a respective plurality of capacitive sensing devices (capacitive sensing device A, capacitive sensing device B, and capacitive sensing device C, respectively). In embodiments in accordance with the present invention, the sensitivity data is received by sensitivity data receiver 902 of FIG. 11.

Referring now to 1208, embodiments in accordance with the present invention determine at least one performance characteristic of one of the plurality of first sensor channels (e.g. sensor channel 202) corresponding to the plurality of first sensor channels (e.g. first sensor channels 102, 202, and 302). More specifically, as shown, for example, in FIG. 4F, the present embodiment determines at least one performance characteristic at or near, for example, point 415. It will be understood that point 415 corresponds to one extreme where the vertical line extending from point 434 intersects the level of desired performance shown by line 428. Also, in embodiments in accordance with the present invention, the determination of the at least one performance characteristic is performed, for example, by performance characteristic determiner 910 of FIG. 11.

Referring now to 1210, similar to 1208, embodiments in accordance with the present invention determine at least one performance characteristic of one of the plurality of second sensor channels (e.g. sensor channel 204) corresponding to the plurality of second sensor channels (e.g. first sensor channels 104, 204, and 304). Also, in embodiments in accordance with the present invention, the determination of the at least one performance characteristic is performed, for example, by performance characteristic determiner 910 of FIG. 11.

Referring now to 1212, similar to 1208 and 1210, embodiments in accordance with the present invention determine at least one performance characteristic of one of the plurality of third sensor channels (e.g. sensor channel 206) corresponding to the plurality of second sensor channels (e.g. first sensor channels 106, 206, and 306). Once again, in embodiments in accordance with the present invention, the determination of the at least one performance characteristic is performed, for example, by performance characteristic determiner 910 of FIG. 11.

Referring again to 1208, 1210, and 1212, in embodiments in accordance with the present invention, the determining of the at least one performance characteristic of one of the plurality of the first, second, and third sensor channels comprises determining a first performance extreme corresponding, respectively, to one of the plurality of first, second, and third sensor channels. That is, in one embodiment in accordance with the present invention, the at least one performance characteristic is determined at the first of two performance extremes corresponding to the respective first, second, or third sensor channel. Furthermore, in another embodiment in accordance with the present invention, the at least one performance characteristic is determined at the second of the two performance extremes corresponding to the respective first, second, or third sensor channel. Also, it should be understood that in various embodiments in accordance with the present invention, the first and second performance extremes correspond to the upper and lower limits of the distribution (e.g. distribution 470).

At 1214, embodiments in accordance with the present invention relate a sensitivity value (shown, for example as $\Delta B1$ relating 434 to a nominal value 425 in FIG. 4F) corresponding to one of the plurality of first sensor channels (for example device B) to a distribution (shown, for example, as 470 in FIG. 4F) corresponding to the one of the plurality of first sensor channels and to the at least one performance characteristic determined above at 1208. Similarly, at 1214, embodiments in accordance with the present invention relate a sensitivity value corresponding to one of the plurality of second sensor channels to a distribution corresponding to the one of the plurality of second sensor channels and to the at least one performance characteristic determined above at 1210. Likewise, at 1214, embodiments in accordance with the present invention relate a sensitivity value corresponding to one of the plurality of third sensor channels to a distribution corresponding to the one of the plurality of third sensor channels and to the at least one performance characteristic determined above at 1212.

Referring still to 1214, it should be noted that, embodiments in accordance with the present invention are also well suited to determining at least one performance characteristic at or near point 490. It will be understood that point 490 corresponds to another extreme where the vertical line extending from point 430 intersects line 428. In so doing, embodiments in accordance with the present invention thereby enable tuning (as described in conjunction with the discussion of FIG. 4D and FIG. 4E) of the plurality of first sensor channels, the plurality of second sensor channels, and the plurality of third sensor channels of the respective plurality of capacitive sensing devices. Also, in embodiments in accordance with the present invention, the relating of a sensitivity value to a distribution and to the at least one performance characteristic is performed, for example, by value relator 908 of FIG. 11. It should be noted that system 1100 of FIG. 11 varies from the system 900 of FIG. 9 in that nominal sensitivity determiner 906 is not optional in FIG. 11, and that range of expected variation receiver 904 is optional in FIG. 11. Hence, in accordance with embodiments of the present invention, it is determined how a "selected" sensor channel falls within the distribution corresponding to the plurality of sensor channels from which the "selected"sensor channel was obtained. This determination then effects how remaining ones of the plurality of sensor channels are tuned based on the "selected" sensor channel's deviation from a nominal sensitivity of the distribution corresponding to the plurality of sensor channels from which the "selected" sensor channel was obtained. As an example, assume that the "selected" sensor channel is 6% below the nominal for the distribution corresponding to the plurality of sensor channels from which the "selected"sensor channel was obtained. Further assume that a performance parameter of the performance optimization curve for the "selected" sensor channel, tuned to the upper performance limit for the selection, for example, 200 sensitivity units, and assume that a performance parameter of the performance optimization curve for the "selected" sensor channel, tuned to the lower performance limit, yields a result of, for example, 100 sensitivity units. Unlike conventional approaches, instead of simply choosing to tune to the middle of the two performance settings (i.e. a performance setting of 150 sensitivity units) as the point at which to set all remaining sensor channels, embodiments in accordance with the present invention determine the appropriate performance setting for all other sensor channels to be the middle of the two readings plus the 6% offset to a nominal sensitivity of the distribution. That is, a 6% offset from the middle reading of 150 sensitivity units could be 159 sensitivity units.

Referring again to 1214, in various embodiments in accordance with the present invention, the relating of a sensitivity value corresponding to one of the plurality of sensor channels (e.g. the first, second, or third sensor channels) to a distribution corresponding to the plurality of sensor channels and to the at least one performance characteristic is based upon sensitivity value variation present in the sensitivity data. More specifically, as shown in FIG. 1, FIG. 2, and FIG. 3, the sensitivity value variation of sensor 202 (i.e. $\Delta B_1$) is less than the sensitivity value variation of sensor channel 102 (i.e. $\Delta A_1$) and the sensitivity value variation of sensor channel 302 (i.e. $\Delta C_1$). Hence, in one embodiment, the sensor channel (202) having an operating sensitivity value closest to the nominal sensitivity value (as depicted by dotted line 108) is selected as the appropriate sensor channel to have its sensitivity value related to the distribution corresponding to the appropriate plurality of sensor channels and to the at least one performance characteristic. Although such an approach is used in the present embodiment, embodiments in accordance with the present invention are well suited to other approaches for using sensitivity value variation to determine which sensor channel should have its sensitivity value related to the distribution corresponding to the plurality of sensor channels and to the at least one performance characteristic. In one such approach, the cumulative sensitivity value variation across all sensor channels of each capacitive sensing device is used to determine which sensor channel will have its sensitivity value related to the distribution corresponding to the plurality of sensor channels and to the at least one performance characteristic.

Referring still to 1214 embodiments in accordance with the present invention are also well suited to arbitrarily selecting one of the plurality of sensor channels as the appropriate sensor channel to have its sensitivity value related to the distribution corresponding to the plurality of sensor channels and to the at least one performance characteristic.

It should be further noted, that embodiments in accordance with the present invention are also well suited to tuning the optimization curve for the sensitivity variation distribution using at least one tuning parameter that changes (e.g. scaling, offset, threshold, hysteresis etc.) or which otherwise transforms the output function based on the capacitive sensor input for a particular range of sensitivities. It should be understood that such a method is a subset of ways that tuning of a capacitive device can be accomplished.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for enabling the tuning of a capacitive sensing device, said method comprising:
   receiving sensitivity data corresponding to a plurality of first sensor channels of a respective plurality of capacitive sensing devices;
   receiving a range of expected variation pertaining to said plurality of first sensor channels, said range of expected variation pertaining to said plurality of first sensor channels having an upper limit and a lower limit;
   relating said range of expected variation pertaining to said plurality of first sensor channels to a sensitivity value corresponding to one of said plurality of first sensor channels; and
   determining at least one performance characteristic of said one of said plurality of first sensor channels near at least one of said upper limit and said lower limit of said range of expected variation pertaining to said plurality of first sensor channels, said at least one performance characteristic enabling the tuning of said plurality of first sensor channels of said respective plurality of capacitive sensing devices.

2. The method as recited in claim 1 wherein said relating said range of expected variation comprises relating said range of expected variation pertaining to said plurality of first sensor channels to a nominal sensitivity value corresponding to said plurality of first sensor channels.

3. The method as recited in claim 1 wherein said relating said range of expected variation comprises relating said range of expected variation pertaining to said plurality of first sensor channels to said sensitivity value corresponding to one of said plurality of first sensor channels based upon sensitivity value variation present in said sensitivity data.

4. The method as recited in claim 1 wherein said determining at least one performance characteristic of said one of said plurality of first sensor channels comprises determining at least one performance characteristic of a first sensor channel having an operating value close to a nominal sensitivity value for said plurality of first sensor channels.

5. The method as recited in claim 1 wherein said determining at least one performance characteristic of said one of said plurality of first sensor channels comprises determining at least one performance characteristic of a first sensor channel arbitrarily selected from said plurality of first sensor channels.

6. The method as recited in claim 1 wherein said determining at least one performance characteristic of said one of said plurality of first sensor channels comprises:
   determining at least one performance characteristic of said one of said plurality of first sensor channels near at least one of said upper limit and said lower limit of said range of expected variation pertaining to said plurality of first sensor channels by adjusting said sensitivity value of said one of said plurality of first sensor channels.

7. The method as recited in claim 1 wherein said determining at least one performance characteristic of said one of said plurality of first sensor channels comprises:
   determining at least one performance characteristic of said one of said plurality of first sensor channels iteratively at said upper limit and said lower limit of said range of expected variation pertaining to said plurality of first sensor channels and, provided said at least one performance characteristic is unsatisfactory at either of said upper limit and said lower limit of said range of expected variation pertaining to said plurality of first sensor channels, adjusting an operating value for said one of said plurality of first sensor channels.

8. The method as recited in claim 1 wherein said determining at least one performance characteristic of said one of said plurality of first sensor channels further comprises:
   utilizing said at least one performance characteristic of said one of said plurality of first sensor channels to tune operating values of remaining ones of said plurality of first sensor channels such that said remaining ones of said plurality of first sensor channels can be tuned without requiring additional testing of said remaining ones of said plurality of first sensor channels.

9. A method for enabling the tuning of capacitive sensing devices, said method comprising:
   receiving sensitivity data corresponding to a plurality of first sensor channels of a respective plurality of capacitive sensing devices;
   utilizing said sensitivity data to determine a nominal sensitivity value and receiving a range of expected variation pertaining to said plurality of first sensor channels, said range of expected variation having an upper limit and a lower limit; and
   relating said nominal sensitivity value and said range of expected variation pertaining to said plurality of first channels; and
   determining at least one performance characteristic of at least one of said plurality of first sensor channels near at least one of said upper limit and said lower limit of said range of expected variation when said at least one of said plurality of first channels is adjusted to exhibit an operating value approximately the same as said nominal sensitivity value, said at least one performance characteristic enabling the tuning of said plurality of first sensor channels of said respective plurality of capacitive sensing devices.

10. The method as recited in claim 9 wherein said relating said nominal sensitivity value said range of expected variation comprises relating said range of expected variation pertaining to said plurality of first sensor channels to said sensitivity value corresponding to one of said plurality of sensor channels based upon sensitivity value variation present in said sensitivity data.

11. The method as recited in claim 9 wherein said determining at least one performance characteristic of said one of said plurality of first sensor channels comprises determining at least one performance characteristic of a first sensor channel arbitrarily selected from said plurality of first sensor channels.

12. The method as recited in claim 9 wherein said determining at least one performance characteristic of said one of said plurality of first sensor channels comprises:
   determining at least one performance characteristic of said one of said plurality of first sensor channels near at least one of said upper limit and said lower limit of said range of expected variation pertaining to said plurality of first sensor channels by adjusting said sensitivity value of said one of said plurality of first sensor channels.

13. The method as recited in claim 9 wherein said determining at least one performance characteristic of said one of said plurality of first sensor channels further comprises:
   utilizing said at least one performance characteristic of said one of said plurality of first sensor channels to tune operating values of remaining ones of said plurality of first sensor channels such that said remaining ones of said plurality of first sensor channels can be tuned without requiring additional testing of said remaining ones of said plurality of first sensor channels.

14. A system for enabling the tuning of a capacitive sensing device, said system comprising:
- a sensitivity data receiver configured to receive sensitivity data corresponding to a plurality of first sensor channels of a respective plurality of capacitive sensing devices;
- a range of expected variation receiver coupled to said sensitivity data receiver, said range of expected variation receiver configured to receive said range of expected variation pertaining to said plurality of first sensor channels, said range of expected variation having an upper limit and a lower limit;
- a value relator coupled to said range of the expected variation receiver, said value relator configured to relate said range of expected variation pertaining to said plurality of first sensor channels to a sensitivity value corresponding to one of said plurality of first sensor channels; and
- a performance characteristic determiner coupled to said value relator, said performance characteristic determiner configured to determine at least one performance characteristic of said one of said plurality of first sensor channels near at least one of said upper limit and said lower limit of said range of expected variation, said at least one performance characteristic enabling the tuning of said plurality of first sensor channels of said respective plurality of capacitive sensing devices.

15. The system of claim 14 further comprising:
- a nominal sensitivity value determiner coupled to said sensitivity data receiver, said nominal sensitivity value determiner configured to utilize said sensitivity data to determine a nominal sensitivity value for said plurality of first sensor channels.

16. A method for enabling the tuning of a capacitive sensing device having multiple sensor channels, said method comprising:
- receiving sensitivity data corresponding to a plurality of first sensor channels of a respective plurality of capacitive sensing devices;
- receiving sensitivity data corresponding to a plurality of second sensor channels of said respective plurality of capacitive sensing devices;
- receiving sensitivity data corresponding to a plurality of third sensor channels of said respective plurality of capacitive sensing devices;
- receiving a range of expected variation pertaining to said plurality of first sensor channels, a range of expected variation pertaining to said plurality of second sensor channels, and a range of expected variation pertaining to said plurality of third sensor channels, wherein said range of expected variation pertaining to said plurality of first sensor channels, said range of expected variation pertaining to said plurality of second sensor channels, and said range of expected variation pertaining to said plurality of third sensor channels, each have an upper limit and a lower limit;
- relating said range of expected variation pertaining to said plurality of first sensor channels to a sensitivity value corresponding to one of said plurality of first sensor channels;
- determining at least one performance characteristic of said one of said plurality of first sensor channels near at least one of said upper limit and said lower limit of said range of expected variation pertaining to said plurality of first sensor channels, said at least one performance characteristic enabling the tuning of said plurality of first sensor channels of said respective plurality of capacitive sensing devices;
- relating said range of expected variation pertaining to said plurality of second sensor channels to a sensitivity value corresponding to one of said plurality of second sensor channels;
- determining at least one performance characteristic of said one of said plurality of second sensor channels near at least one of said upper limit and said lower limit of said range of expected variation pertaining to said plurality of second sensor channels, said at least one performance characteristic enabling the tuning of said plurality of second sensor channels of said respective plurality of capacitive sensing devices;
- relating said range of expected variation pertaining to said plurality of third sensor channels to a sensitivity value corresponding to one of said plurality of third sensor channels; and
- determining at least one performance characteristic of said one of said plurality of third sensor channels near at least one of said upper limit and said lower limit of said range of expected variation pertaining to said plurality of third sensor channels, said at least one performance characteristic enabling the tuning of said plurality of third sensor channels of said respective plurality of capacitive sensing devices.

17. The method as recited in claim 16 wherein said one of said plurality of first sensor channels, said one of said plurality of second sensor channels, and said one of said plurality of third sensor channels reside on the same capacitive sensing device.

18. The method as recited in claim 16 wherein said relating said range of expected variation pertaining to said plurality of first sensor channels comprises relating said range of expected variation pertaining to said plurality of first sensor channels to a nominal sensitivity value corresponding to said plurality of first sensor channels.

19. The method as recited in claim 16 wherein said relating said range of expected variation pertaining to said plurality of first sensor channels comprises relating said range of expected variation pertaining to said plurality of first sensor channels to said sensitivity value corresponding to one of said plurality of first sensor channels based upon sensitivity value variation present in said sensitivity data corresponding to said plurality of first sensor channels.

20. The method as recited in claim 16 wherein said determining at least one performance characteristic of said one of said plurality of first sensor channels comprises determining at least one performance characteristic of a first sensor channel having an operating value close to a nominal sensitivity value for said plurality of first sensor channels.

21. The method as recited in claim 16 wherein said determining at least one performance characteristic of said one of said plurality of first sensor channels comprises determining at least one performance characteristic of a first sensor channel arbitrarily selected from said plurality of first sensor channels.

22. The method as recited in claim 16 wherein said determining at least one performance characteristic of said one of said plurality of first sensor channels comprises:
- determining at least one performance characteristic of said one of said plurality of first sensor channels near at least one of said upper limit and said lower limit of said range of expected variation pertaining to said plurality of first sensor channels by adjusting said sensitivity value of said one of said plurality of first sensor channels.

23. The method as recited in claim 16 wherein said determining at least one performance characteristic of said one of said plurality of first sensor channels comprises:
  determining at least one performance characteristic of said one of said plurality of first sensor channels iteratively at said upper limit and said lower limit of said range of expected variation pertaining to said plurality of first sensor channels and, provided said at least one performance characteristic is unsatisfactory at either of said upper limit and said lower limit of said range of expected variation, adjusting an operating value for said one of said plurality of first sensor channels.

24. The method as recited in claim 16 wherein said determining at least one performance characteristic of said one of said plurality of first sensor channels further comprises:
  utilizing said at least one performance characteristic of said one of said plurality of first sensor channels to tune operating values of remaining ones of said plurality of first sensor channels such that said remaining ones of said plurality of first sensor channels can be tuned without requiring additional testing of said remaining ones of said plurality of first sensor channels.

25. The method as recited in claim 16 wherein said relating said range of expected variation pertaining to said plurality of second sensor channels comprises relating said range of expected variation pertaining to said plurality of second sensor channels to a nominal sensitivity value corresponding to said plurality of second sensor channels.

26. The method as recited in claim 16 wherein said relating said range of expected variation pertaining to said plurality of second sensor channels comprises relating said range of expected variation pertaining to said plurality of second sensor channels to said sensitivity value corresponding to one of said plurality of second sensor channels based upon sensitivity value variation present in said sensitivity data corresponding to said plurality of second sensor channels.

27. The method as recited in claim 16 wherein said determining at least one performance characteristic of said one of said plurality of second sensor channels comprises determining at least one performance characteristic of a second sensor channel having an operating value close to a nominal sensitivity value for said plurality of second sensor channels.

28. The method as recited in claim 16 wherein said determining at least one performance characteristic of said one of said plurality of second sensor channels comprises determining at least one performance characteristic of a second sensor channel arbitrarily selected from said plurality of sensor channels.

29. The method as recited in claim 16 wherein said determining at least one performance characteristic of said one of said plurality of second sensor channels comprises:
  determining at least one performance characteristic of said one of said plurality of second sensor channels near at least one of said upper limit and said lower limit of said range of expected variation pertaining to said plurality of second sensor channels by adjusting said sensitivity value of said one of said plurality of second sensor channels.

30. The method as recited in claim 16 wherein said determining at least one performance characteristic of said one of said plurality of second sensor channels comprises:
  determining at least one performance characteristic of said one of said plurality of second sensor channels iteratively at said upper limit and said lower limit of said range of expected variation pertaining to said plurality of second sensor channels and, provided said at least one performance characteristic is unsatisfactory at either of said upper limit and said lower limit of said range of expected variation, adjusting an operating value for said one of said plurality of second sensor channels.

31. The method as recited in claim 16 wherein said determining at least one performance characteristic of said one of said plurality of second sensor channels further comprises:
  utilizing said at least one performance characteristic of said one of said plurality of second sensor channels to tune operating values of remaining ones of said plurality of second sensor channels such that said remaining ones of said plurality of second sensor channels can be tuned without requiring additional testing of said remaining ones of said plurality of second sensor channels.

32. The method as recited in claim 16 wherein said relating said range of expected variation pertaining to said plurality of third sensor channels comprises relating said range of expected variation pertaining to said plurality of third sensor channels to a nominal sensitivity value corresponding to said plurality of third sensor channels.

33. The method as recited in claim 16 wherein said relating said range of expected variation pertaining to said plurality of third sensor channels comprises relating said range of expected variation pertaining to said plurality of third sensor channels to said sensitivity value corresponding to one of said plurality of third sensor channels based upon sensitivity value variation present in said sensitivity data corresponding to said plurality of third sensor channels.

34. The method as recited in claim 16 wherein said determining at least one performance characteristic of said one of said plurality of third sensor channels comprises determining at least one performance characteristic of a third sensor channel having an operating value close to a nominal sensitivity value for said plurality of third sensor channels.

35. The method as recited in claim 16 wherein said determining at least one performance characteristic of said one of said plurality of third sensor channels comprises determining at least one performance characteristic of a third sensor channel arbitrarily selected from said plurality of third sensor channels.

36. The method as recited in claim 16 wherein said determining at least one performance characteristic of said one of said plurality of third sensor channels comprises:
  determining at least one performance characteristic of said one of said plurality of third sensor channels near at least one of said upper limit and said lower limit of said range of expected variation pertaining to said plurality of third sensor channels by adjusting said sensitivity value of said one of said plurality of third sensor channels.

37. The method as recited in claim 16 wherein said determining at least one performance characteristic of said one of said plurality of third sensor channels comprises:
  determining at least one performance characteristic of said one of said plurality of third sensor channels iteratively at said upper limit and said lower limit of said range of expected variation pertaining to said plurality of third sensor channels and, provided said at least one performance characteristic is unsatisfactory at either of said upper limit and said lower limit of said range of expected variation, adjusting an operating value for said one of said plurality of third sensor channels.

38. The method as recited in claim 16 wherein said determining at least one performance characteristic of said one of said plurality of third sensor channels further comprises:
  utilizing said at least one performance characteristic of said one of said plurality of third sensor channels to tune operating values of remaining ones of said plurality of third sensor channels such that said remaining ones of said plurality of third sensor channels can be tuned without requiring additional testing of said remaining ones of said plurality of third sensor channels.

39. A method for enabling the tuning of a capacitive sensing device, said method comprising:

receiving sensitivity data corresponding to a plurality of first sensor channels of a respective plurality of capacitive sensing devices;

determining at least one performance characteristic of said one of said plurality of first sensor channels corresponding to said one of said plurality of first sensor channels, near a first performance extreme; and relating a sensitivity value corresponding to said one of said plurality of first sensor channels to a distribution corresponding to said plurality of first sensor channels and to said at least one performance characteristic, thereby enabling the tuning of said plurality of first sensor channels.

40. The method as recited in claim 39 wherein the determining at least one performance characteristic of said one of said plurality of first sensor channels corresponding to said one of said plurality of first sensor channels includes determining a second performance extreme corresponding to said one of said plurality of first sensor channels.

41. The method as recited in claim 39 wherein said relating a sensitivity value corresponding to said one of said plurality of first sensor channels to a distribution corresponding to said plurality of first sensor channels and to said at least one performance characteristic is based upon sensitivity value variation present in said sensitivity data.

42. The method as recited in claim 39 wherein said determining at least one performance characteristic of said one of said plurality of first sensor channels comprises determining at least one performance characteristic of a first sensor channel arbitrarily selected from said plurality of first sensor channels.

43. A method for enabling the tuning of a capacitive sensing device, said method comprising:

receiving sensitivity data corresponding to a plurality of first sensor channels of a respective plurality of capacitive sensing devices;

receiving sensitivity data corresponding to a plurality of second sensor channels of a respective plurality of capacitive sensing devices;

receiving sensitivity data corresponding to a plurality of third sensor channels of a respective plurality of capacitive sensing devices;

determining at least one performance characteristic of said one of said plurality of first sensor channels corresponding to said one of said plurality of first sensor channels, near a first performance extreme corresponding to said one of said plurality of first sensor channels;

determining at least one performance characteristic of said one of said plurality of second sensor channels corresponding to said one of said plurality of second sensor channels, near a first performance extreme corresponding to said one of said plurality of second sensor channels;

determining at least one performance characteristic of said one of said plurality of third sensor channels corresponding to said one of said plurality of third sensor channels, near a first performance extreme corresponding to said one of said plurality of third sensor channels; and relating a sensitivity value corresponding to said one of said plurality of first sensor channels and to said one of said plurality of second sensor channels and to said one of said plurality of third sensor channels to a distribution corresponding to said one of said plurality of each of the respective sensor channels and to said performance characteristic, thereby enabling the tuning of said plurality of first sensor channels, said plurality of second sensor channels, and said plurality of third sensor channels of said respective plurality of capacitive sensing devices.

44. The method as recited in claim 43 wherein said one of said plurality of first sensor channels, said one of said plurality of second sensor channels, and said one of said plurality of third sensor channels reside on the same capacitive sensing device.

45. The method as recited in claim 43 wherein said determining at least one performance characteristic of said one of said plurality of first sensor channels comprises determining at least one performance characteristic of a first sensor channel arbitrarily selected from said plurality of first sensor channels.

46. The method as recited in claim 43 remaining ones of said plurality of first sensor channels can be tuned without requiring additional testing of said remaining ones of said plurality of first sensor channels.

47. The method as recited in claim 43 wherein said determining at least one performance characteristic of said one of said plurality of second sensor channels comprises determining at least one performance characteristic of a second sensor channel arbitrarily selected from said plurality of second sensor channels.

48. The method as recited in claim 43 remaining ones of said plurality of second sensor channels can be tuned without requiring additional testing of said remaining ones of said plurality of second sensor channels.

49. The method as recited in claim 43 wherein said determining at least one performance characteristic of said one of said plurality of third sensor channels comprises determining at least one performance characteristic of a third sensor channel arbitrarily selected from said plurality of third sensor channels.

50. The method as recited in claim 43 remaining ones of said plurality of third sensor channels can be tuned without requiring additional testing of said remaining ones of said plurality of third sensor channels.

* * * * *